United States Patent
Ichise et al.

(10) Patent No.: US 12,087,340 B2
(45) Date of Patent: Sep. 10, 2024

(54) MAGNETIC RECORDING MEDIUM

(71) Applicant: Sony Group Corporation, Tokyo (JP)

(72) Inventors: Natsuki Ichise, Tokyo (JP); Minoru Yamaga, Tokyo (JP); Katsunori Maeshima, Tokyo (JP); Masaru Terakawa, Tokyo (JP); Takeshi Takahashi, Tokyo (JP); Tomoe Sato, Tokyo (JP); Takashi Kataguchi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/760,555

(22) PCT Filed: Sep. 4, 2020

(86) PCT No.: PCT/JP2020/033522
§ 371 (c)(1),
(2) Date: Mar. 15, 2022

(87) PCT Pub. No.: WO2021/059922
PCT Pub. Date: Apr. 1, 2021

(65) Prior Publication Data
US 2022/0392488 A1    Dec. 8, 2022

(30) Foreign Application Priority Data
Sep. 26, 2019    (JP) .................. 2019-176117

(51) Int. Cl.
G11B 5/706    (2006.01)
G11B 5/73     (2006.01)

(52) U.S. Cl.
CPC .................. *G11B 5/739* (2019.05)

(58) Field of Classification Search
CPC .................. G11B 5/70642; G11B 5/7379
See application file for complete search history.

(56) References Cited

U.S. PATENT DOCUMENTS

| | | |
|---|---|---|
| 2012/0177951 A1 | 7/2012 | Yamazaki et al. |
| 2015/0279408 A1 | 10/2015 | Hosoya |

(Continued)

FOREIGN PATENT DOCUMENTS

| | | |
|---|---|---|
| JP | H03209627 A | 9/1991 |
| JP | 2012142529 A | 7/2012 |

(Continued)

OTHER PUBLICATIONS

English Machine Translation: Kawakami et al. (JP 2019023950).*
International Search Report from corresponding PCT application PCT/JP2020/033522, dated Nov. 17, 2020.

*Primary Examiner* — Holly Rickman
*Assistant Examiner* — Linda N Chau
(74) *Attorney, Agent, or Firm* — K&L Gates LLP

(57) ABSTRACT

A magnetic recording medium is a tape-shaped magnetic recording medium that has a recording layer including an ε-iron oxide particle. An area ratio $R_{low}$ $(=(S_{low}/S_{total})\times 100)$ of a total area $S_{total}$ of an SFD curve of the recording layer in a perpendicular direction and an area $S_{low}$ of the SFD curve in which a coercivity Hc is in a range from $-500$ $[Oe] \leq Hc \leq 500$ $[Oe]$ is equal to or less than 5.5%.

8 Claims, 7 Drawing Sheets

(56) References Cited

U.S. PATENT DOCUMENTS

| | | | |
|---|---|---|---|
| 2017/0270955 A1* | 9/2017 | Kataoka | G11B 5/7379 |
| 2018/0226093 A1* | 8/2018 | Terakawa | G11B 5/70642 |
| 2019/0096436 A1 | 3/2019 | Ozawa | |

FOREIGN PATENT DOCUMENTS

| | | |
|---|---|---|
| JP | 2015201246 A | 11/2015 |
| JP | 2019023950 A | 2/2019 |
| JP | 2019067466 A | 4/2019 |
| WO | WO-2016047559 A | 3/2016 |
| WO | 2019159466 A1 | 8/2019 |

* cited by examiner

[ FIG. 1 ]
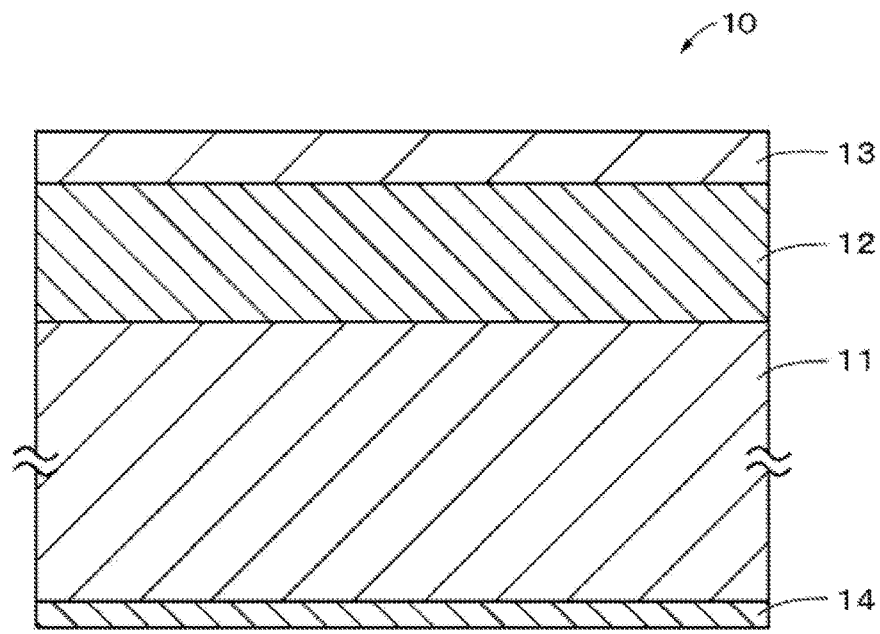
[ FIG. 2 ]
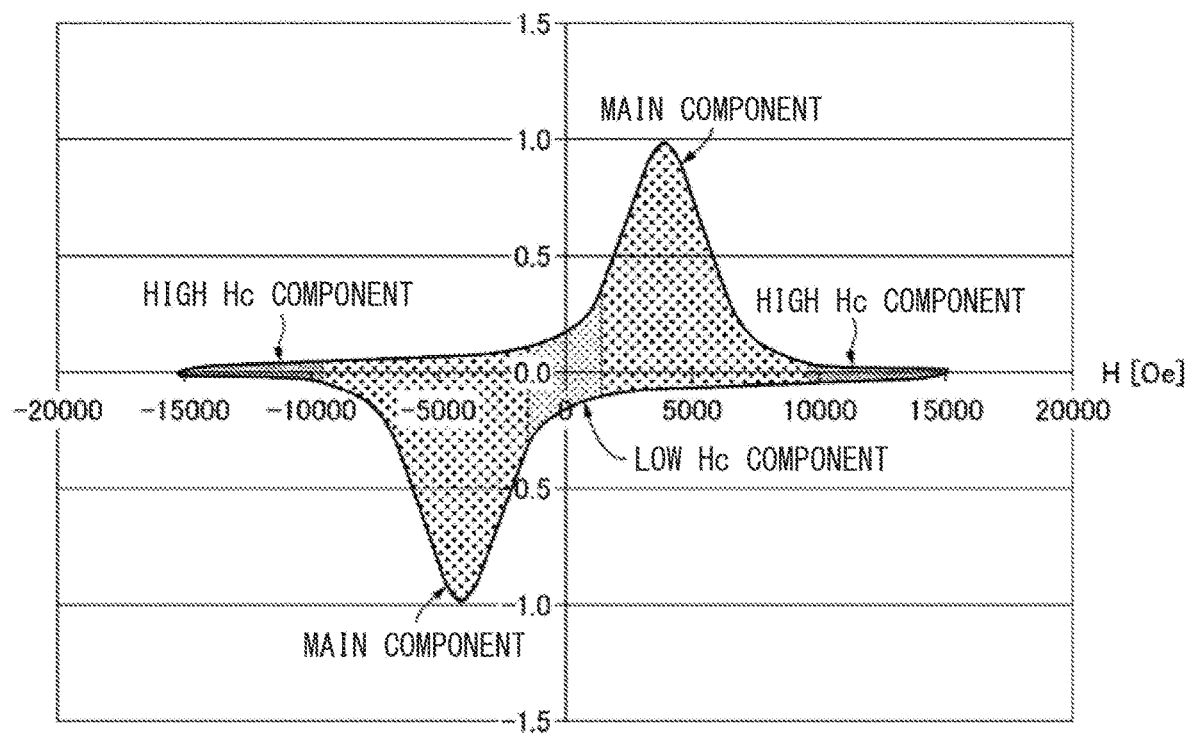

[FIG. 3]
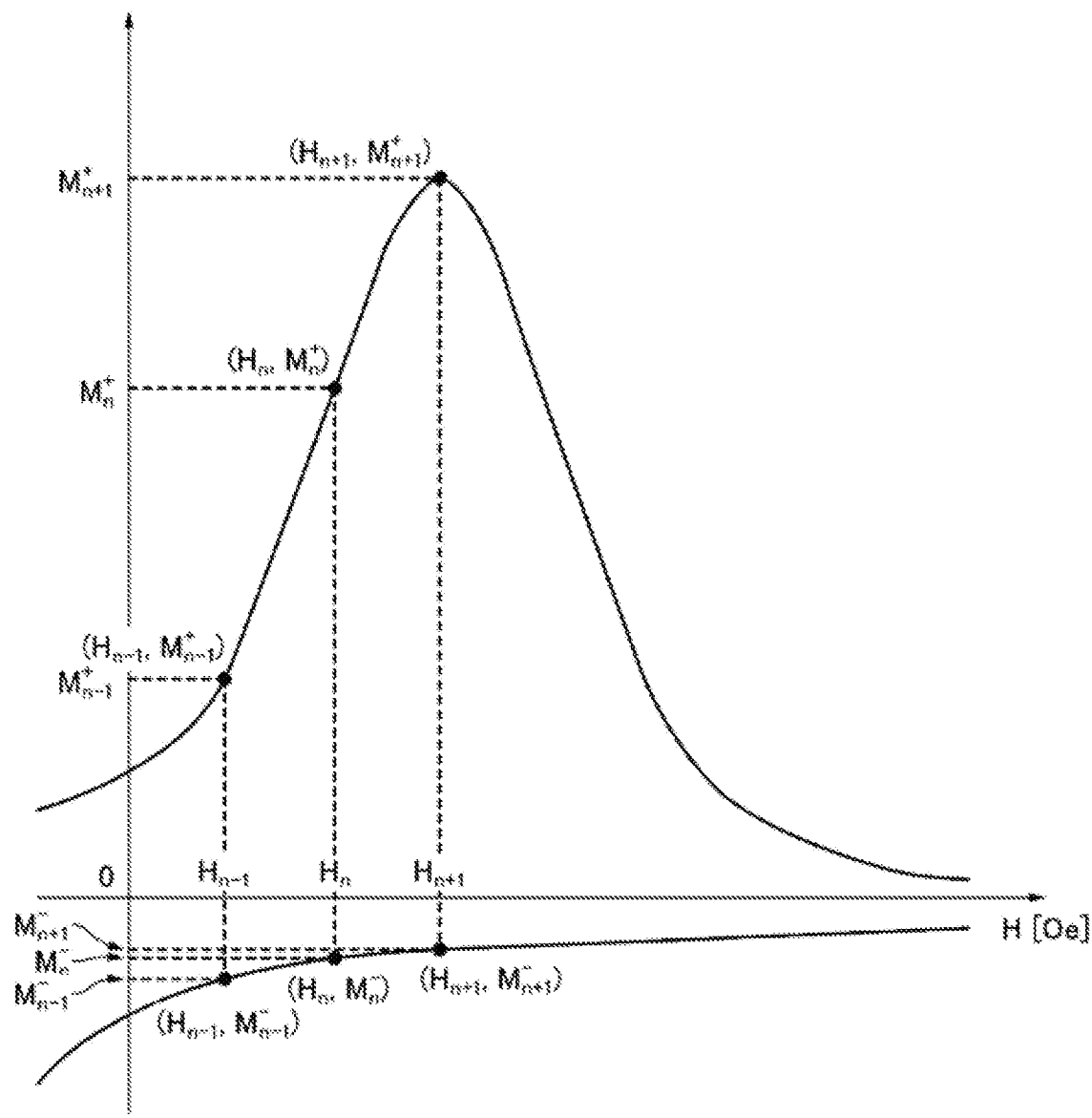

[FIG. 4]
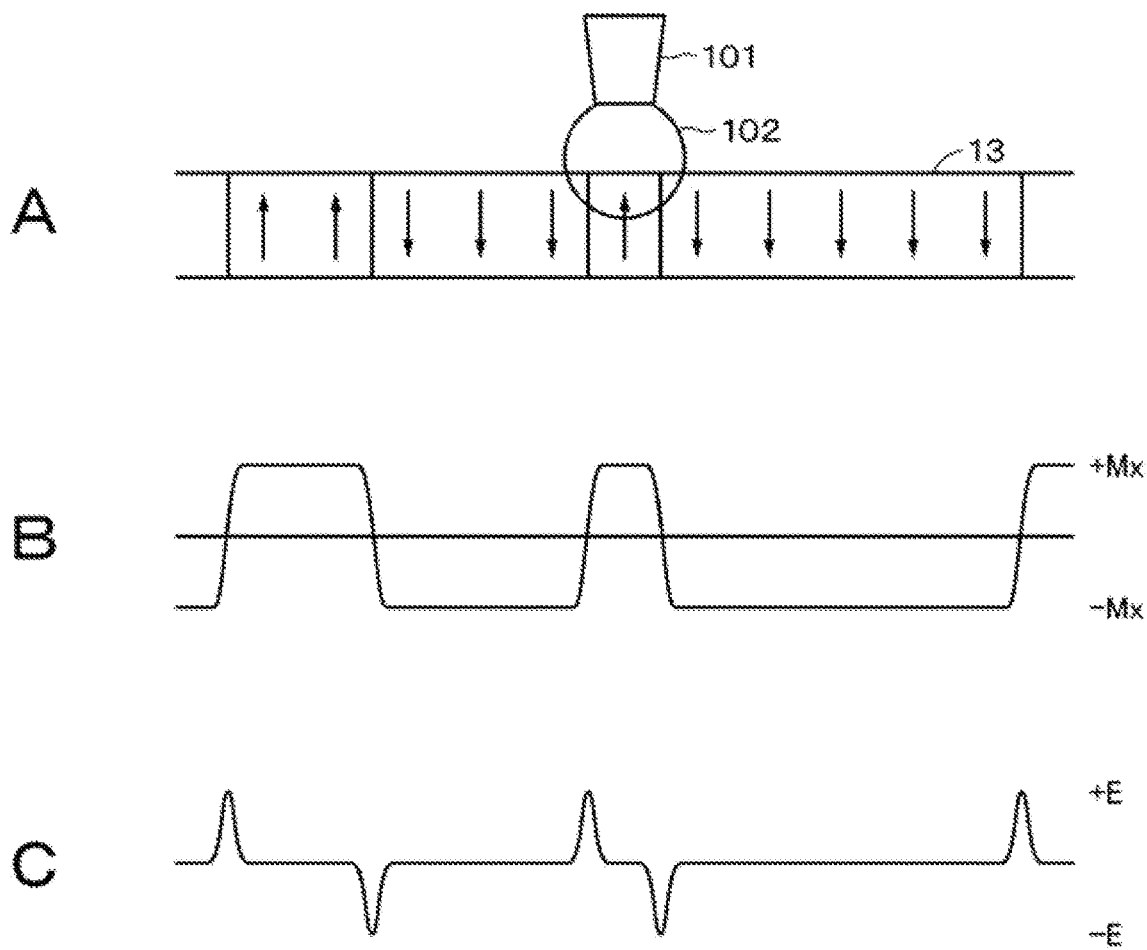

[FIG. 5]
A
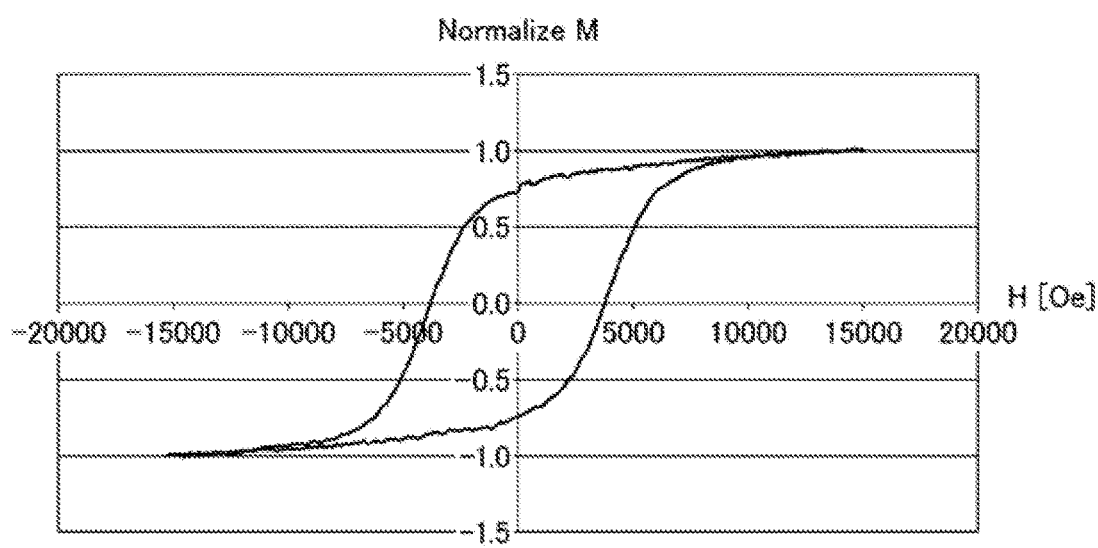
B
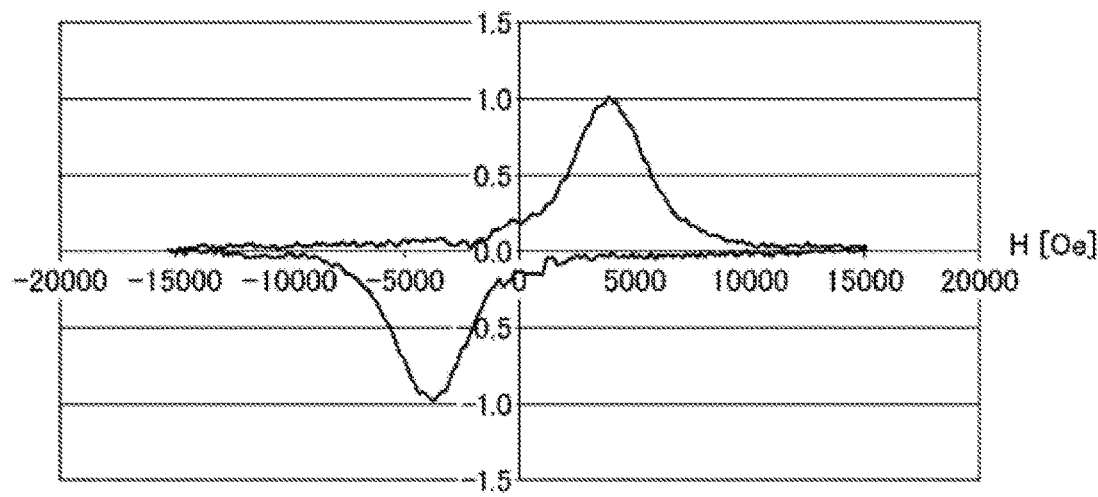

[FIG. 6]
A
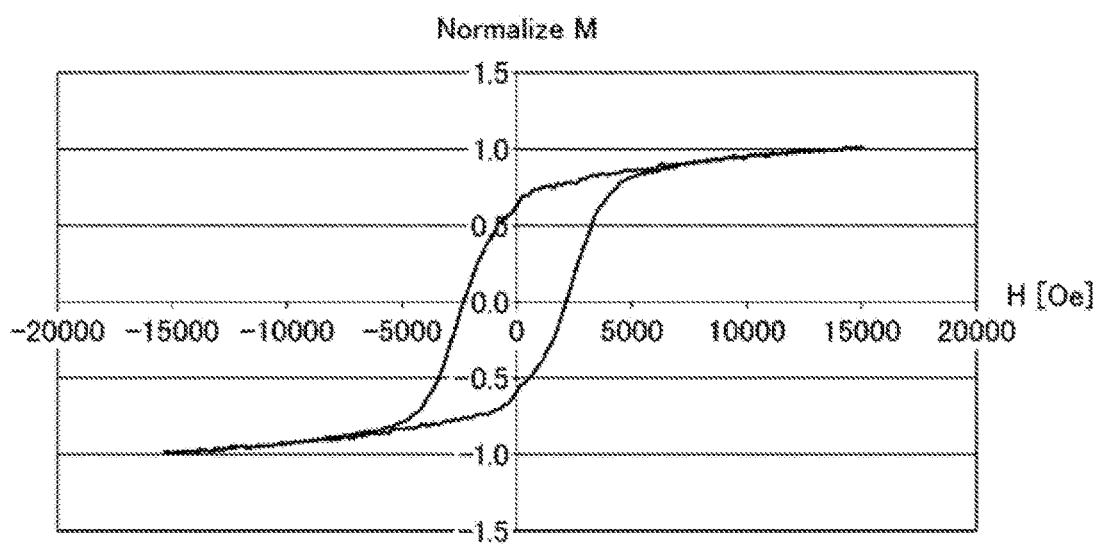
B
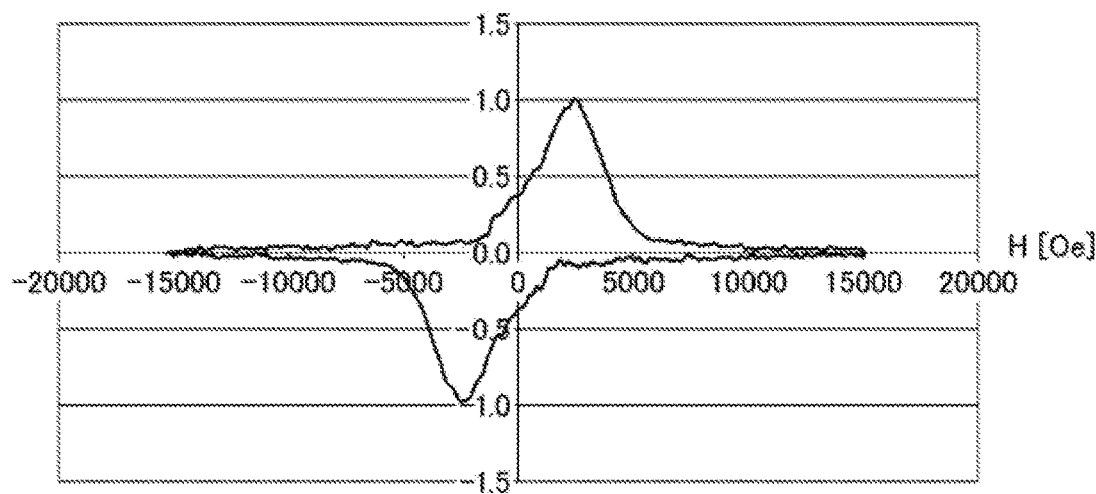

[FIG. 7]
A
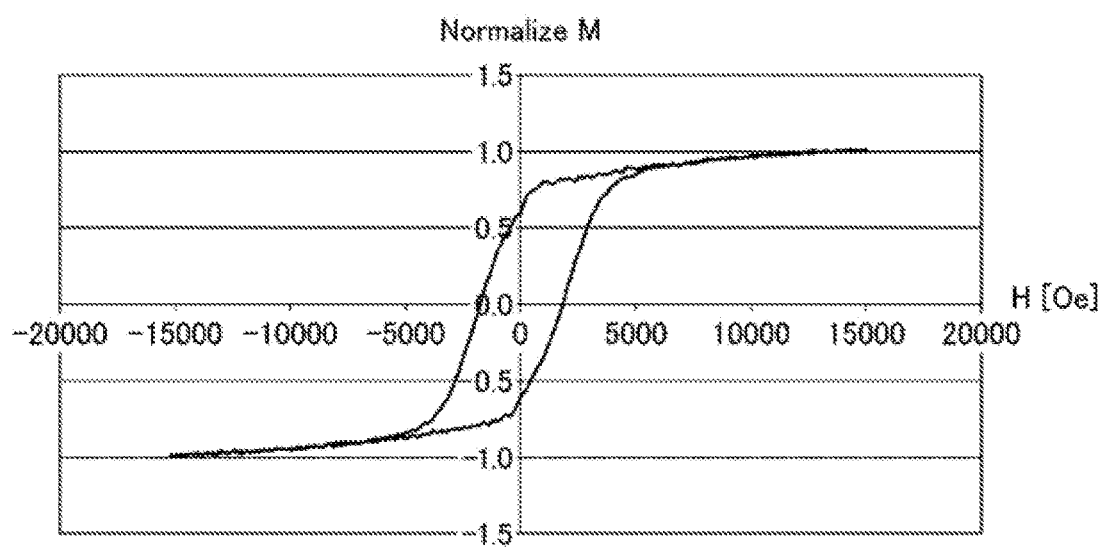
B
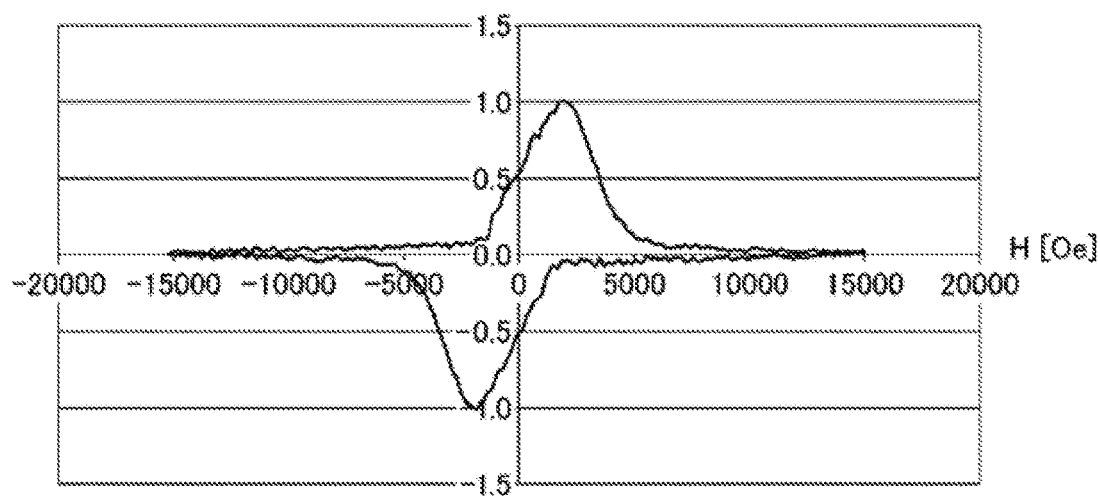

[FIG. 8]
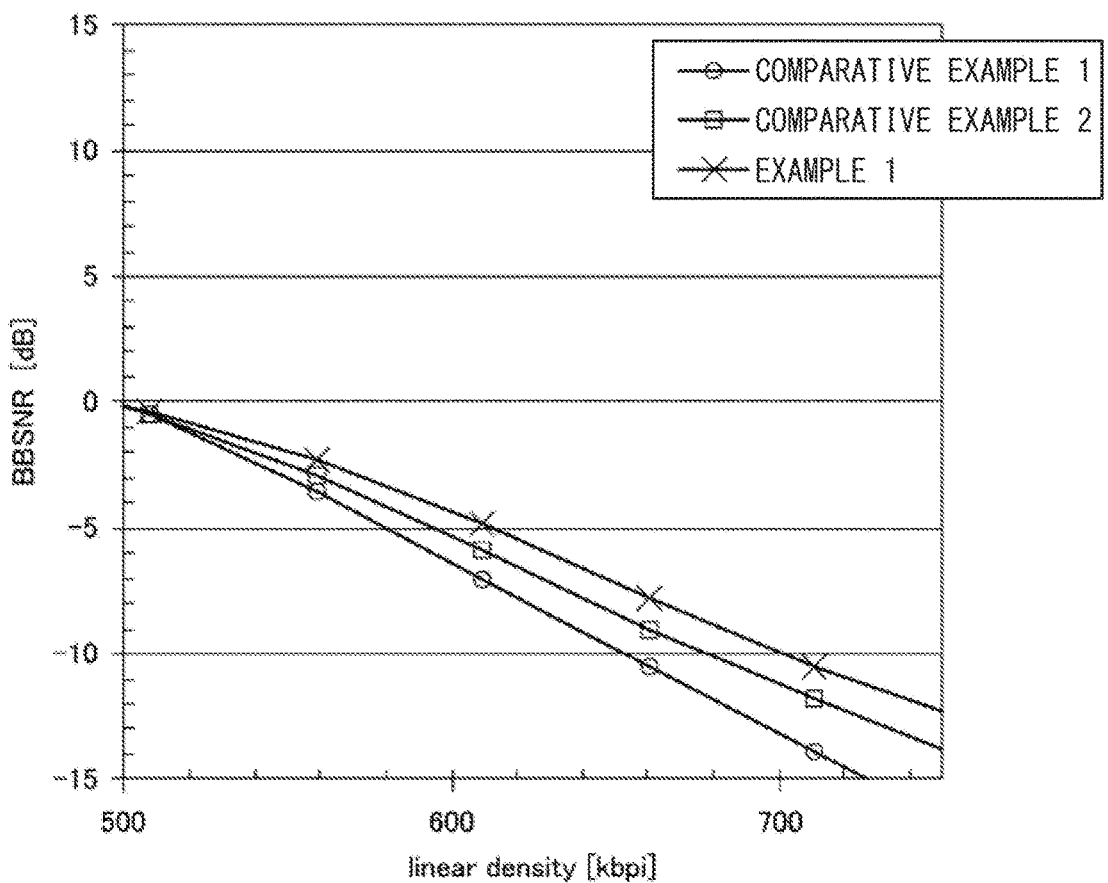
[FIG. 9]
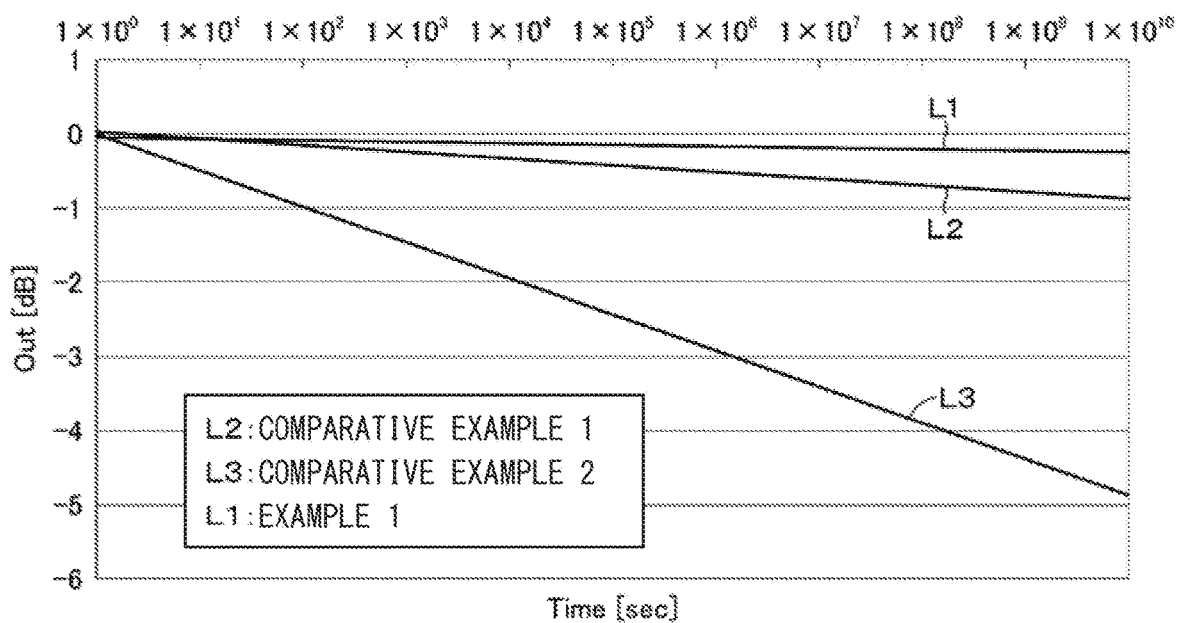

MAGNETIC RECORDING MEDIUM

TECHNICAL FIELD

The present disclosure relates to a magnetic recording medium.

BACKGROUND ART

In recent years, in order to achieve a high recording density of a tape-shaped magnetic recording medium, a magnetic powder included in a recording layer has been made fine-grained. However, when the magnetic powder is fine-grained, magnetic powders are affected by an external heat in a use environment of a magnetic tape and an influence of a thermal disturbance of a magnetization becomes significant, causing a phenomenon in which a recorded magnetization disappears. In order to suppress the influence of the thermal disturbance of the magnetization, it has been studied to use an ε-iron oxide magnetic powder having a high coercivity Hc as the magnetic powder (see, for example, Patent Literature 1).

CITATION LIST

Patent Literature

Patent Literature 1: Japanese Unexamined Patent Application Publication No. 2007-269548

SUMMARY OF THE INVENTION

Problem to be Solved by the Invention

However, a magnetic recording medium that uses an ε-iron oxide magnetic powder can sometimes decrease an electromagnetic conversion characteristic.

It is an object of the present disclosure to provide a magnetic recording medium that makes it possible to achieve a good electromagnetic conversion characteristic.

Means for Solving the Problem

In order to solve the above-described problem, the present disclosure is a tape-shaped magnetic recording medium. The magnetic recording medium has a recording layer including an ε-iron oxide particle, and has an area ratio $R_{low}(=(S_{low}/S_{total})\times100)$ of a total area $S_{total}$ of an SFD curve of the recording layer in a perpendicular direction and an area $S_{low}$ of the SFD curve in which a coercivity Hc is in a range from $-500\ [Oe] \leq Hc \leq 500\ [Oe]$ is equal to or less than 5.5%.

BRIEF DESCRIPTION OF THE DRAWINGS

FIG. 1 is a cross-sectional diagram illustrating an example of a configuration of a magnetic recording medium according to an embodiment of the present disclosure.

FIG. 2 is a diagram illustrating an example of an SFD curve.

FIG. 3 is a diagram for describing a calculation method of a total area $S_{total}$ of the SFD curve.

FIG. 4A is a schematic diagram illustrating an example of a configuration of a recording layer at the time of signal recording. FIG. 4B is a schematic diagram illustrating an example of a magnetization distribution in a perpendicular direction. FIG. 4C is a schematic diagram illustrating an example of a waveform of a reproduction signal (a reproduction voltage).

FIG. 5A is a graph illustrating an M-H loop measured by applying a magnetic field in a perpendicular direction of a magnetic tape according to Example 1. FIG. 5B is a graph illustrating an SFD curve obtained from the M-H loop of FIG. 5A.

FIG. 6A is a graph illustrating an M-H loop measured by applying a magnetic field in a perpendicular direction of a magnetic tape according to comparative example 1. FIG. 6B is a graph illustrating an SFD curve obtained from the M-H loop of FIG. 6A.

FIG. 7A is a graph illustrating an M-H loop measured by applying a magnetic field in a perpendicular direction of a magnetic tape according to comparative example 2. FIG. 7B is a graph illustrating an SFD curve obtained from the M-H loop of FIG. 7A.

FIG. 8 is a graph illustrating evaluation results of an electromagnetic conversion characteristic of the magnetic tapes according to Example 1 and comparative examples 1 and 2.

FIG. 9 is a graph illustrating evaluation results of a signal attenuation amount of the magnetic tapes according to Example 1 and comparative examples 1 and 2.

MODES FOR CARRYING OUT THE INVENTION

An embodiment of the present disclosure is described in the following order.
1 Configuration of Magnetic Recording Medium
2 Magnetic Property, etc., of Recording Layer
3 Method of Manufacturing Magnetic Recording Medium
4 Workings and Effects

1 Configuration of Magnetic Recording Medium

FIG. 1 is a cross-sectional diagram illustrating an example of a configuration of a magnetic recording medium 10. The magnetic recording medium 10 is a so-called tape-shaped magnetic recording medium, and includes a base 11, a foundation layer 12 provided on one principal face (a first principal surface) of the base 11, a recording layer 13 provided on the foundation layer 12, and a back layer 14 provided on the other principal face (a second principal surface) of the base 11. Note that the foundation layer 12 and the back layer 14 are provided on an as-necessary basis and may not be provided. The magnetic recording medium 10 may be a magnetic recording medium of a perpendicular recording type or a magnetic recording medium of a longitudinal recording type.

The magnetic recording medium 10 is preferably used in a recording reproducing apparatus that includes a ring-shaped head as a recording head. It is preferable that the magnetic recording medium 10 be able to keep a width of the magnetic recording medium 10 constant or substantially constant by adjusting a tension in a longitudinal direction of the magnetic recording medium 10 by the recording reproducing apparatus upon traveling.

(Base)

The base 11 is a non-magnetic supporting body that supports the foundation layer 12 and the recording layer 13. The base 11 has an elongated film-like shape. An upper limit value of an average thickness of the base 11 is preferably 4.2 µm or less, more preferably 3.8 µm or less, and still more preferably 3.4 µm or less. If the upper limit value of the average thickness of the base 11 is 4.2 μm or less, it is possible to increase a recording capacity that allows for recording in one data cartridge as compared with a typical magnetic recording medium. A lower limit value of the average thickness of the base 11 is preferably 3 μm or greater, more preferably 3.2 μm or greater. If the lower limit value of the average thickness of the base 11 is 3 μm or greater, it is possible to suppress a decrease in strength of the base 11.

The average thickness of the base 11 is determined as follows. First, the magnetic recording medium 10 having a width of ½ inch is prepared and the magnetic recording medium 10 is cut into a length of 250 mm to fabricate a sample. Subsequently, layers other than the base 11 of the sample (i.e., the foundation layer 12, the recording layer 13, and the back layer 14) are removed with a solvent such as MEK (methyl ethyl ketone) or dilute hydrochloric acid. Next, using a laser hologage (LGH-110C) manufactured by Mitutoyo Corporation as a measurement apparatus, a thickness of the sample (the base 11) is measured at positions of five or more, and measurement values at those positions are simply averaged (an arithmetic average) to calculate the average thickness of the base 11. Note that the measurement positions are randomly selected from the sample.

The base 11 includes, for example, at least one of polyesters, polyolefins, cellulose derivatives, vinyl-based resins, aromatic polyether ketones (PAEK), or other polymeric resins. In a case where the base 11 includes two or more of the above materials, the two or more of them may be mixed, copolymerized, or laminated.

The polyesters include, for example, at least one of PET (polyethylene terephthalate), PEN (polyethylene naphthalate), PBT (polybutylene terephthalate), PBN (polybutylene naphthalate), PCT (polycyclohexylenedimethylene terephthalate), PEB (polyethylene-p-oxybenzoate), or polyethylene bisphenoxycarboxylate.

The polyolefins include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl-based resins include, for example, at least one of PVC (polyvinyl chloride) or PVDC (polyvinylidene chloride). The aromatic polyether ketones (PAEK) include, for example, polyether ether ketone (PEEK).

Other polymeric resins include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, for example, Zylon (Registered Trademark)), polyether, PEK (polyether ketone), polyetherester, PES (polyether sulfone), PEI (polyetherimide), PSF (polysulfone), PPS (polyphenylene sulfide), PC (polycarbonate), PAR (polyarylate), or PU (polyurethane).

(Recording Layer)

The recording layer 13 is a so-called magnetic layer. The recording layer 13 is a recording layer for recording a signal by a magnetization pattern. The recording layer 13 may be a recording layer of a perpendicular recording type or a recording layer of a longitudinal recording type. A servo pattern may be written in advance in the recording layer 13 on an as-necessary basis. The recording layer 13 includes, for example, a magnetic powder and a binder. The recording layer 13 may further include, on an as-necessary basis, at least one of additives such as a lubricant, an antistatic agent, an abrasive, a hardener, an antirust agent, or a non-magnetic reinforcing particle.

An upper limit value of an average thickness $t_m$ of the recording layer 13 is 80 nm or less, preferably 70 nm or less, and more preferably 50 nm or less. If the upper limit value of the average thickness $t_m$ of the recording layer 13 is 80 nm or less, it is possible to reduce an influence of an antimagnetic field and thereby to improve an electromagnetic conversion characteristic in a case where a ring-type head is used as a recording head.

A lower limit value of the average thickness $t_m$ of the recording layer 13 is preferably 35 nm or greater. If the lower limit value of the average thickness $t_m$ of the recording layer 13 is 35 nm or greater, it is possible to secure an output and thereby to improve an electromagnetic conversion characteristic in a case where an MR-type head is used as a reproducing head.

The average thickness $t_m$ of the recording layer 13 is determined as follows. First, a carbon layer is formed on a surface on the recording layer 13 side and a surface on the back layer 14 side of the magnetic recording medium 10 by an evaporation method, following which a tungsten layer is further formed on the surface on the recording layer 13 side by an evaporation method. These layers are formed to protect a sample in a thin-sectioning process described later. Next, the magnetic recording medium 10 formed with the above-described layers is processed by a FIB (Focused Ion Beam) method to be thin-sectioned. The thin-sectioning takes place in a length direction (a longitudinal direction) of the magnetic recording medium 10. That is, the thin-sectioning forms a cross-section that is parallel to both the longitudinal direction and a thickness direction of the magnetic recording medium 10.

The cross-section of the thus-obtained thin-sectioned sample is observed by a transmission electron microscope (Transmission Electron Microscope: TEM) under the following condition to obtain a TEM image. Note that a magnification and an accelerating voltage may be adjusted on an as-necessary basis depending on a type of an apparatus.

Apparatus: TEM (H9000NAR manufactured by Hitachi, Ltd.)
Accelerating voltage: 300 kV
Magnification: 100,000 times Next, the thus-obtained TEM image is used to measure a thickness of the recording layer 13 at positions of at least 10 points in the longitudinal direction of the magnetic recording medium 10. Obtained measurement values are simply averaged (an arithmetic average), and the obtained average value is taken as the average thickness $t_m$[nm] of the recording layer 13. Note that the positions at which the measurement is performed are randomly selected from a test piece.

(Magnetic Powder)

The magnetic powder includes a plurality of magnetic particles. The magnetic particle is a particle including an epsilon-type iron oxide (hereinafter referred to as an "ε iron oxide particle"). The magnetic powder is preferably crystallographically oriented preferentially in the thickness direction (the perpendicular direction) of the magnetic recording medium 10.

The ε iron oxide particle is a hard magnetic particle that makes it possible to achieve a high coercivity even with fine particles. The ε iron oxide particle has spherical or substantially spherical shapes, or have cubic or substantially cubic shapes. Because the ε iron oxide particle has the above-described shape, it is possible to reduce a contacting area of the particles in the thickness direction of the magnetic recording medium 10 and to suppress the aggregation of the particles in a case where the ε iron oxide particle is used as the magnetic particle, as compared with a case where a hexagonal plate-shaped barium ferrite particle is used as the magnetic particle. Therefore, it is possible to increase a dispersion property of the magnetic powder and to improve an electromagnetic conversion characteristic.

The ε iron oxide particle may have a core-shell type structure. Specifically, the ε iron oxide particle includes a core section and a shell section having a two-layer structure provided around the core section. The shell section having the two-layer structure includes a first shell section provided on the core section and a second shell section provided on the first shell section.

The core section includes an ε iron oxide. The ε iron oxide included in the core section preferably includes an ε-$Fe_2O_3$ crystal as a main phase, more preferably includes ε-$Fe_2O_3$ of a single phase.

The first shell section covers at least a portion of the circumference of the core section. Specifically, the first shell section may partially cover the circumference of the core section or may cover the entire circumference of the core section. From a viewpoint of allowing an exchange coupling between the core section and the first shell section to be sufficient and improving a magnetic property, it is preferable that the entire surface of the core section be covered.

The first shell section is a so-called soft magnetic layer, and may include, for example, a soft magnetic material such as α-Fe, an Ni—Fe alloy, or an Fe—Si—Al alloy. The α-Fe may be obtained by the reduction of the ε iron oxide included in the core section.

The second shell section is an oxidation coating serving as an antioxidant layer. The second shell section may include α iron oxide, aluminum oxide, or silicon oxide. The α iron oxide may include, for example, iron oxide of at least one of $Fe_3O_4$, $Fe_2O_3$, or FeO. Ina case where the first shell section includes the α-Fe (the soft magnetic material), the α-iron oxide may be obtained by the oxidation of the α-Fe included in the first shell section.

The ε iron oxide particle has the first shell section as described above, making it possible to adjust the coercivity Hc of the ε-iron oxide particle (the core shell particle) as a whole to the coercivity Hc suitable for recording while keeping the coercivity Hc of the core section alone to a larger value to ensure a thermal stability. Further, because the ε iron oxide particle has the second shell section as described above, it is possible to suppress a decrease in property of the ε iron oxide particle due to the exposure of the ε iron oxide particle into the air and the occurrence of rust or the like on a particle surface during a manufacturing process of the magnetic recording medium 10 and a process prior thereto. Accordingly, it is possible to suppress a degradation of a characteristic of the magnetic recording medium 10.

The ε iron oxide particle may have the shell section having a single layer structure. In this case, the shell section has a similar configuration to the first shell section. However, from a viewpoint of suppressing a degradation of the property of the ε iron oxide particle, it is more preferable that the ε iron oxide particle have the shell section having the two-layer structure.

The ε iron oxide particle may include an additive element instead of the core-shell structure, or may have the core-shell structure and include the additive element together. In these cases, a portion of Fe of the ε iron oxide particle is substituted by the additive element. It is possible to adjust the coercivity Hc of the ε iron oxide particle as a whole to the coercivity Hc suitable for the recording by including the additive element in the ε iron oxide particle, and thereby to improve a recording easiness. The additive element is one or more of a metal element other than iron, preferably a trivalent metal element, more preferably at least one of Al, Ga or In, and still more preferably at least one of Al or Ga.

Specifically, the ε iron oxide including the additive element is an ε-$Fe_{2-x}M_xO_3$ crystal (where M is one or more of a metal element other than iron, preferably a trivalent metal element, more preferably at least one of Al, Ga or In, and still more preferably at least one of Al or Ga, and x is, for example, 0<x<1).

An upper limit value of an average particle size (an average maximum particle size) of the magnetic powder is preferably 24.25 nm or less, more preferably 22.5 nm or less, still more preferably 20.75 nm or less, and most preferably 15 nm or less. A lower limit value of the average particle size (the average maximum particle size) of the magnetic powder is preferably 8 nm or greater, more preferably 12 nm or greater. By setting the average particle size of the magnetic powder to ¼ or less of a shortest recording wavelength, it is possible to improve an electromagnetic conversion characteristic. Accordingly, if the average particle size of the magnetic powder is 24.25 nm or less, it is possible to improve an electromagnetic conversion characteristic in the magnetic recording medium 10 of a high recording density configured to allow recording of a signal at a shortest recording wavelength of equal to or less than 97 nm. On the other hand, if the average particle size of the magnetic powder is 8 nm or greater, the dispersion property of the magnetic powder is further improved, making it possible to improve an electromagnetic conversion characteristic.

An average aspect ratio of the magnetic powder is preferably 1.0 or greater and 3.0 or less, more preferably 1.0 or greater and 2.5 or less, still more preferably 1.0 or greater and 2.1 or less, and particularly preferably 1.0 or greater and 1.8 or less. If the average aspect ratio of the magnetic powder is within a range of 1.0 or greater and 3.0 or less, it is possible to suppress the aggregation of the magnetic powder. In addition, it is possible to suppress resistance to be applied to the magnetic powder at the time of a perpendicular orientation of the magnetic powder in a process of forming the recording layer 13. Hence, it is possible to improve a perpendicular orientation property of the magnetic powder.

The average particle size and the average aspect ratio of the magnetic powder are determined as follows. First, a thin-sectioned sample is obtained in a manner similar to that of a calculation method of the average thickness $t_m$ of the recording layer 13. Next, a cross-sectional observation of the cross-section described above of the thus-obtained thin-sectioned sample is performed using a transmission electron microscope (H-9500 manufactured by Hitachi High Technologies Corporation) at the accelerating voltage: 200 kV and a total magnification of 500,000 in such a manner that the recording layer 13 as a whole is included in the thickness direction of the recording layer 13 to take a TEM photograph. Next, 50 particles in each of which a shape of the particle is clearly confirmable are selected from the photographed TEM photograph, and a major axis length DL and a minor axis length DS of each particle are measured. Here, the major axis length DL means the largest of distances between two parallel lines drawn from every angle so as to be in contact with a contour of each particle (a so-called largest Feret's diameter). On the other hand, the minor axis length DS means the largest of lengths of the particle in a direction orthogonal to the major axis (DL) of the particle. Subsequently, the major axis lengths DL of the 50 particles thus measured are simply averaged (an arithmetic average)

to determine an average major axis length $DL_{ave}$. The average major axis length $DL_{ave}$ thus determined is the average particle size of the magnetic powder. In addition, the minor axis lengths DS of the 50 particles thus measured are simply averaged (an arithmetic average) to determine an average minor axis length $DS_{ave}$. Further, an average aspect ratio ($DL_{ave}/DS_{ave}$) of the particle is determined from the average major axis length $DL_{ave}$ and the average minor axis length $DS_{ave}$.

An average particle volume of the magnetic powder is preferably 5600 nm$^3$ or less, more preferably 250 nm$^3$ or greater and 5600 nm$^3$ or less, still more preferably 900 nm$^3$ or greater and 5600 nm$^3$ or less, particularly preferably 900 nm$^3$ or greater and 1800 nm$^3$ or less, and most preferably 900 nm$^3$ or greater and 1500 nm$^3$ or less. In general, a noise of the magnetic recording medium 10 is inversely proportional to the square root of the number of particles (i.e., proportional to the square root of the particle volume). Thus, it is possible to improve an electromagnetic conversion characteristic by making the particle volume smaller. Accordingly, if the average particle volume of the magnetic powder is 5600 nm$^3$ or less, it is possible to improve an electromagnetic conversion characteristic in the magnetic recording medium 10 of a high recording density (for example, the magnetic recording medium 10 configured to allow recording of a signal at a shortest recording wavelength of 44 nm or less). On the other hand, if the average particle volume of the magnetic powder is 250 nm$^3$ or greater, the dispersion property of the magnetic powder is improved, making it possible to improve an electromagnetic conversion characteristic.

In a case where the s iron oxide particle has a spherical or substantially spherical shape, the average particle volume of the magnetic powder is determined as follows. First, the average major axis length $DL_{ave}$ is determined in a similar manner to the calculation method of the average particle size of the magnetic powder described above. Next, an average particle volume V of the magnetic powder is determined by the following expression.

$$V = (\pi/6) \times DL_{ave}^3$$

In a case where the ε iron oxide particle has a cubic shape or a substantially cubic shape, the average particle volume of the magnetic powder is determined as follows. First, a thin-sectioned sample is obtained in a manner similar to that of a calculation method of the average thickness $t_m$ of the recording layer 13. Next, a cross-sectional observation of the cross-section of the thus-obtained thin-sectioned sample is performed using a transmission electron microscope (H-9500 manufactured by Hitachi High Technologies Corporation) at the accelerating voltage: 200 kV and a total magnification of 500,000 in such a manner that the recording layer 13 as a whole is included in the thickness direction of the recording layer 13 to take a TEM photograph. Note that the magnification and the accelerating voltage may be adjusted on an as-necessary basis depending on a type of an apparatus. Next, 50 particles in each of which a shape of the particle is clearly confirmable are selected from the photographed TEM photograph, and a length DC of a side of each particle is measured. Subsequently, the lengths DC of the sides of the 50 particles thus measured are simply averaged (an arithmetic average) to determine an average side length $DC_{ave}$. Next, the average particle volume $V_{ave}$ of the magnetic powder (a particle volume) is determined using the average side length $DC_{ave}$ from the following expression.

$$V_{ave} = DC_{ave}^3$$

A proportion $R_{\sigma/D}$ ($=(\sigma/D)\times 100$) of a standard deviation a of a particle size distribution of the magnetic particle to the average particle size D of the magnetic powder is preferably $R_{\sigma/D} \leq 15\%$, more preferably $R_{\sigma/D} \leq 13\%$. If a proportion $R_1$ is $R_{\sigma/D} \leq 15\%$, the variation in particle size of the magnetic particle becomes small, making it possible to suppress the variation in magnetic property of the magnetic powder (for example, the coercivity Hc of the magnetic powder). A lower limit value of the proportion $R_{\sigma/D}$ is not particularly limited, but is, for example, $5\% \leq R_{\sigma/D}$.

The proportion $R_{\sigma/D}$ described above is determined as follows. First, particle sizes (the major axis lengths DL) of 50 particles are determined in a manner similar to that of a calculation method of the average particle size of the magnetic powder to obtain a particle size distribution. Next, a median diameter (a 50% diameter, D50) is determined from the thus-obtained particle size distribution, and the median diameter is used as an average particle size D. Further, the standard deviation a is determined from the obtained particle size distribution. Next, the proportion $R_{\sigma/D}$ ($=(\sigma/D)\times 100$) is calculated using the obtained average particle size D and the standard deviation a of the particle size distribution.

(Binder)

Examples of the binder include a thermoplastic resin, a thermosetting resin, and a reactive resin. Examples of the thermoplastic resin include polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, nitrocellulose), styrene butadiene copolymer, polyester resin, amino resin, and synthetic rubber.

Examples of the thermosetting resin may include phenolic resin, epoxy resin, polyurethane cure-type resin, urea resin, melamine resin, alkyd resin, silicone resin, polyamine resin, and urea formaldehyde resin.

In addition, a polar functional group such as —SO$_3$M, —OSO$_3$M, —COOM, or P=O(OM)$_2$ may be introduced into each of the binders described above for a purpose of improving the dispersion property of the magnetic powder. Here, in the expression, M is a hydrogen atom, or an alkali metal such as, for example, lithium, potassium, or sodium. Further, examples of the polar functional group include that of a side chain type having a terminal group of —NR1R2, —NR1R2R3$^+$X$^-$, and that of a main chain type of >NR1R2$^+$X$^-$. Where, in the expressions, R1, R2, and R3 are independently a hydrogen atom or a hydrocarbon group from each other, and X$^-$ is, for example, a halogen element ion such as fluorine, chlorine, bromine, or iodine, or an inorganic or organic ion. Further, examples of the polar functional group include —OH, —SH, —CN, or epoxy groups. An amount of the polar functional groups to be introduced into the binder is preferably 10$^{-1}$ to 10$^{-8}$ mol/g, more preferably 10$^{-2}$ to 10$^{-6}$ mol/g.

(Lubricant)

Examples of the lubricant include esters of monobasic fatty acids having 10 to 24 carbon atoms and any of 1 to 6 valent alcohols having 2 to 12 carbon atoms, mixed esters thereof, difatty acid esters, and trifatty acid esters. Specific examples of the lubricant include lauric acid, myristic acid, palmitic acid, stearic acid, behenic acid, oleic acid, linoleic acid, linolenic acid, elidic acid, butyl stearate, pentyl stearate, heptyl stearate, octyl stearate, isooctyl stearate, and octyl myristate.

(Antistatic Agent)

Examples of the antistatic agent include carbon black, natural surfactants, nonionic surfactants, and cationic surfactants.

(Abrasive)

Examples of the abrasive include α-alumina whose pregelatinized rate is 90% or greater, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α iron oxide obtained by the dehydration of a raw material of magnetic iron oxide and the anneal process, and any of those having been subjected to a surface treatment with aluminum and/or silica as necessary.

(Hardener)

Examples of the hardener include polyisocyanates. Examples of the polyisocyanate include aromatic polyisocyanates such as an adduct of tolylene diisocyanate (TDI) and an active hydrogen compound, and aliphatic polyisocyanates such as an adduct of hexamethylene diisocyanate (HMDI) and the active hydrogen compound. A weight average molecular weight of the polyisocyanates is desirably in a range of 100 to 3000.

(Antirust Agent)

Examples of the antirust agent include phenols, naphthols, quinones, heterocyclic compounds containing a nitrogen atom, heterocyclic compounds containing an oxygen atom, and heterocyclic compounds containing a sulfur atom.

(Non-Magnetic Reinforcing Particle)

Examples of the non-magnetic reinforcing particle include aluminum oxide (α, β, or γ alumina), chromium oxide, silicon oxide, diamonds, garnets, emeries, boron nitride, titanium carbide, silicon carbide, titanium carbide, and titanium oxide (rutile or anatase-type titanium oxide).

(Foundation Layer)

The foundation layer 12 is for easing an unevenness of a surface of the base 11 and adjusting an unevenness of a surface of the recording layer 13. The foundation layer 12 is a non-magnetic layer including a non-magnetic powder and a binder. The foundation layer 12 may further include, on an as-necessary basis, at least one additive of the lubricant, the antistatic agent, the hardener, the antirust agent, and the like.

An average thickness of the foundation layer 12 is preferably 0.3 µm or greater and 2.0 µm or less, more preferably 0.5 µm or greater and 1.4 µm or less. If the average thickness of the foundation layer 12 is 2.0 µm or less, a stretchability of the magnetic recording medium 10 by an external force increases, facilitating an adjustment of a width of the magnetic recording medium 10 by a tension adjustment. The average thickness of the foundation layer 12 is determined in a manner similar to that of the average thickness of the recording layer 13. However, a magnification of a TEM image is adjusted on an as-necessary basis depending on the thickness of the foundation layer 12.

(Non-Magnetic Powder)

The non-magnetic powder includes, for example, at least one of an inorganic particle powder or an organic particle powder. Further, the non-magnetic powder may include a carbon powder such as carbon black. Note that one type of non-magnetic powder may be used alone, or two or more types of non-magnetic powder may be used in combination. The inorganic particles include, for example, metals, metal oxides, metal carbonates, metal sulfates, metal nitrides, metal carbides, metal sulfides, or the like. Examples of a shape of the non-magnetic powder include various shapes such as a needle-shape, a spherical shape, a cubic shape, and a plate shape, although the shape of the non-magnetic powder is not limited thereto.

(Binder)

The binder is similar to the recording layer 13 described above.

(Additive)

The lubricant, the antistatic agent, the hardener, and the antirust agent are respectively similar to those of the recording layer 13 described above.

(Back Layer)

The back layer 14 includes a binder and a non-magnetic powder. The back layer 14 may further include at least one additive of a lubricant, a hardener, an antistatic agent, and the like on an as-necessary basis. The binder and the non-magnetic powder are similar to those of the foundation layer 12 described above.

An average particle size of the non-magnetic powder is preferably 10 nm or greater and 150 nm or less, more preferably 15 nm or greater and 110 nm or less. The average particle size of the non-magnetic powder is determined in a similar manner to the average particle size of the magnetic powder described above. The non-magnetic powder may include a non-magnetic powder having two or more particle size distributions.

An upper limit of an average thickness $t_b$ of the back layer 14 is preferably 0.6 µm or less. If the upper limit of the average thickness of the back layer 14 is 0.6 µm or less, it is possible to keep the thicknesses of the foundation layer 12 and the base 11 thick and thereby to maintain a traveling stability of the magnetic recording medium 10 in the recording reproducing apparatus, even in a case where the average thickness $t_b$ of the magnetic recording medium 10 is 5.6 µm or less. A lower limit value of the average thickness $t_b$ of the back layer 14 is not particularly limited, but is, for example, 0.2 µm or greater.

The average thickness $t_b$ of the back layer 14 is determined as follows. First, an average thickness $t_T$ of the magnetic recording medium 10 is measured. A method of measuring the average thickness $t_T$ is as described in "Average Thickness of Magnetic Recording Medium" to be described later. Subsequently, the back layer 14 of a sample is removed with a solvent such as MEK (methyl ethyl ketone) or dilute hydrochloric acid. Next, using the laser hologage (LGH-110C) manufactured by Mitutoyo Corporation, a thickness of the sample is measured at positions of five or more, and measurement values at those positions are simply averaged (an arithmetic average) to calculate an average value $t_B[\mu m]$. Thereafter, the average thickness $t_b[\mu m]$ of the back layer 14 is determined from the following expression. Note that the measurement positions are randomly selected from the sample.

$$t_b[\mu m] = t_T[\mu m] - t_B[\mu m]$$

2 Magnetic Property, Etc., of Recording Layer (Coercivity Hc)

A lower limit value of the coercivity Hc of the recording layer 13 in the perpendicular direction of the magnetic recording medium 10 is preferably 3000 [Oe] or greater, more preferably 3250 [Oe] or greater, still more preferably 3500 [Oe] or greater, and particularly preferably 3750 [Oe] or greater. If the coercivity Hc of the recording layer 13 in the perpendicular direction is 3000 [Oe] or greater, it is possible to suppress a decrease in the thermal stability Tb of the magnetic recording medium 10.

An upper limit value of the coercivity Hc of the recording layer 13 in the perpendicular direction of the magnetic recording medium 10 is preferably 5000 [Oe] or less, more preferably 4500 [Oe] or less, and still more preferably 4000 [Oe] or less. If the coercivity Hc of the recording layer 13 in the perpendicular direction is 5000 [Oe] or less, a saturated recording by a recording head is facilitated, making it possible to achieve a good electromagnetic conversion characteristic.

The coercivity Hc described above is determined as follows. First, three sheets of magnetic recording media 10 are superimposed by a double-sided tape, following which the superimposed magnetic recording media 10 are punched out by a punch of φ6.39 mm to fabricate a measurement sample. At this time, a marking is performed with any ink having no magnetic property so that the longitudinal direction (the traveling direction) of the magnetic recording medium 10 is recognizable. Further, an M-H loop of the measurement sample (the magnetic recording medium 10 as a whole) corresponding to the perpendicular direction (the thickness direction) of the magnetic recording medium 10 is measured using a vibrating sample magnetometer (Vibrating Sample Magnetometer: VSM). Next, acetone, ethanol, or the like is used to remove coating films (such as the foundation laver 12, the recording layer 13, or the back layer 14) to leave only the base 11. Further, three sheets of thus-obtained bases 11 are superimposed by a double-sided tape, following which the superimposed bases 11 are punched out by a punch of φ6.39 mm to fabricate a sample for a background correction (hereinafter simply referred to as a "correction sample"). Thereafter, an M-H loop of the correction sample (the base 11) corresponding to the perpendicular direction of the base 11 (the perpendicular direction of the magnetic recording medium 10) is measured using the VSM.

In measuring the M-H loop of the measurement sample (the magnetic recording medium 10 as a whole) and the M-H loop of the correction sample (the base 11), a high-sensitivity vibrating sample magnetometer "VSM-P7-15 type" manufactured by Toei Industry Co., Ltd. is used. Measurement conditions include a measurement mode; full-loop, a maximum magnetic field: 15 kOe, a magnetic field step: 40 bit, Time constant of Locking amp: 0.3 sec, Waiting time: 1 sec, and MH-average: 20.

After the M-H loop of the measurement sample (the magnetic recording medium 10 as a whole) and the M-H loop of the correction sample (the base 11) are obtained, the M-H loop of the correction sample (the base 11) is subtracted from the M-H loop of the measurement sample (the magnetic recording medium 10 as a whole) to perform the background correction, and an M-H loop following the background correction is obtained. To perform a calculation of the background correction, measurement and analysis programs attached to the "VSM-P7-15 type" are used. The coercivity Hc is determined from the thus-obtained M-H loop following the background correction. It should be noted that the measurement and analysis programs attached to the "VSM-P7-15 type" are used for this calculation. In addition, the measurements of the M-H loops described above are each performed at 25° C. Further, a "diamagnetic field correction" upon measuring the M-H loop in the perpendicular direction of the magnetic recording medium 10 is not performed.

(Squareness Ratio)

The squareness ratio Rs of the recording layer 13 in the perpendicular direction (the thickness direction) of the magnetic recording medium 10 is preferably 65% or greater, more preferably 70% or greater, still more preferably 75% or greater, particularly preferably 80% or greater, and most preferably 85% or greater. If the squareness ratio Rs is 65% or greater, a perpendicular orientation property of the magnetic powder becomes sufficiently high, making it possible to improve an electromagnetic conversion characteristic.

The squareness ratio Rs in the perpendicular direction is determined as follows. First, an M-H loop following the background correction is obtained in a manner similar to that of the measurement method of the coercivity Hc described above. Next, a saturation magnetization Ms[emu] and a remanent magnetization Mr[emu] of the thus-obtained M-H loop following the background correction are substituted into the following expression to calculate the squareness ratio Rs [%].

$$\text{Squareness ratio } Rs(\%) = (Mr/Ms) \times 100$$

(SFD)

It is possible to evaluate a distribution of the coercivity Hc by SFD (Switching Field Distribution). The SFD of the recording layer 13 in the perpendicular direction of the magnetic recording medium 10 is defined by Ha/Hc, where, in the SFD curve of the recording layer 13 in the perpendicular direction of the magnetic recording medium 10, Ha is a half-value width (a full width at half maximum) of a main peak positioned on the side where the coercivity Hc is positive, and Hc is a coercivity of the recording layer 13. It should be noted that the measurement and analysis programs attached to the "VSM-P7-15 type" are used for this calculation.

An upper limit value of the SFD of the recording layer 13 in the perpendicular direction of the magnetic recording medium 10 is preferably 1.1 or less, more preferably 1 or less, and still more preferably 0.93 or less. If the SFD is 1.1 or less, it is possible to suppress the variation in the coercivity Hc. Accordingly, it is possible to suppress a low Hc component and a high Hc component of the recording layer 13. A lower limit value of the SFD is, for example, 0.1 or greater. The closer the SFD is to a value of 0 such as 0.1, the sharper the Hc distribution is, and it is possible to improve an electromagnetic conversion characteristic of the magnetic recording medium 10. It should be noted that, as used herein, the term "low Hc component" refers to a component in which the coercivity Hc is in a range from $-500 \text{ [Oe]} \leq Hc \leq 500 \text{ [Oe]}$. Further, the term "high Hc component" refers to a component in which the coercivity Hc is in a range from $-15000 \text{ [Oe]} \leq Hc \leq -10000 \text{ [Oe]}$ and in which the coercivity Hc is in a range from $10000 \text{ [Oe]} \leq Hc \leq 15000 \text{ [Oe]}$.

The SFD of the recording layer 13 in the perpendicular direction of the magnetic recording medium 10 is determined as follows. First, an M-H loop following the background correction is determined in a manner similar to that of the measurement method of the coercivity Hc described above. Next, a differential curve of the M-H loop following the background correction (hereinafter referred to as an "SFD curve") is determined, and a half width Ha of the SFD curve is determined. Next, the SFD is determined by normalizing the thus-obtained half width Ha by the coercivity Hc. It should be noted that the measurement and analysis programs attached to the "VSM-P7-15 type" are used for this calculation.

(Area Ratio of SFD Curve)

FIG. 2 is a diagram illustrating an example of the SFD curve of the recording layer 13 in the perpendicular direction. An area ratio $R_{low}$ (=($S_{low}/S_{total}$)×100) of a total area $S_{total}$ of the SFD curve of the recording layer 13 in the perpendicular direction and an area $S_{low}$ of the SFD curve of the recording layer 13 in the perpendicular direction in which the coercivity Hc is in a range from −500 [Oe] ≤Hc≤500 [Oe] is 5.5% or less, preferably 5% or less, more preferably 4% or less, still more preferably 3.6% or less. If the area ratio $S_R$ is 5.5% or less, it is possible to reduce the low Hc component of the recording layer 13. Accordingly, it is possible to suppress a magnetization reversal resulting from a leakage magnetic field from a magnetic head at the time of writing a signal. Hence, it is possible to achieve a good electromagnetic conversion characteristic. A lower limit value of the area ratio $R_{low}$ is, for example, 1% or greater, preferably 0% or greater. Specifically, the area $S_{low}$ means the area of a region surrounded by the SFD curve, a straight line Hc=−500, and a straight line Hc=500.

An area ratio $R_{high}$ (=($S_{high}/S_{total}$)×100) of the total area $S_{total}$ of the SFD curve of the recording layer 13 in the perpendicular direction and an area $S_{high}$ of the SFD curve of the recording layer 13 in the perpendicular direction in which the coercivity Hc is in a range from −15000 [Oe] ≤Hc≤−10000 [Oe] and in which the coercivity Hc is in a range from 10000 [Oe]≤Hc≤15000 [Oe] is preferably 5.5% or less, more preferably 5% or less, and even more preferably 4.5% or less. If the $R_{high}$ is 5.5% or less, it is possible to reduce, at the time of writing a signal, the high Hc component by which the magnetization reversal resulting from a magnetic field from a magnetic head becomes difficult, making it possible to improve an output signal. Accordingly, it is possible to achieve a better electromagnetic conversion characteristic. A lower limit value of the area ratio $R_{high}$ is, for example, 1% or greater, preferably 0% or greater. Specifically, the area $S_{high}$ means the sum of: the area of a region surrounded by the SFD curve, a straight line Hc=−15000, and a straight line Hc=−10000; and the area of a region surrounded by the SFD curve, a straight line Hc=10000, and a straight line Hc=15000.

It should be noted that it is possible to set the area ratio $R_{low}$ and the area $S_{high}$ to desired values by adjusting at least one of a manufacturing condition of the magnetic powder or a preparation condition of a recording layer formation paint.

An SFD curve determined in a manner similar to that of a calculation method of the SFD described above is used for the calculation of the total area $S_{total}$, the area $S_{low}$, and the area $S_{high}$ of the SFD curve. FIG. 3 illustrates an SFD curve of the first quadrant and the second quadrant in an enlarged fashion. Here, a vertical axis is divided into m in a range of −15000 [Oe]≤H≤15000 [Oe], and the dividing points thereof are defined as H0, $H_1$, ..., $H_n$, $H_{n+1}$, ..., $H_{m-1}$, $H_m$, where n and m are natural numbers. A horizontal axis represents a magnetic field H as illustrated in FIG. 3.

The coordinates of an intersection of a straight line H=$H_n$ and the SFD curve in the first quadrant (0≤H, 0≤M) and the second quadrant (H≤0, 0≤M) is defined as ($H_n$, $M_n^+$), the coordinates of an intersection of a straight line H=$H_{n+1}$ and the SFD curve in the first quadrant (0≤H, 0≤M) and the second quadrant (H≤0, 0≤M) is defined as ($H_{n+1}$, $M_{n+1}^+$), the coordinates of an intersection of the straight line H=$H_n$ and the SFD curve in the third quadrant (H≤0, M≤0) and the fourth quadrant (0≤H, M≤0) is defined as ($H_n$, $M_n^-$), and the coordinates of an intersection of the straight line H=$H_{n+1}$ and the SFD curve in the third quadrant (H≤0, M≤0) and the fourth quadrant (0≤H, M≤0) is defined as ($H_{n+1}$, $M_{n+1}^-$). In a case where the coordinates are thus defined, an area $S_n$ of a quadrangle in which the coordinates ($H_n$, $M_n^+$), ($H_{n+1}$, $M_{n+1}^+$), ($H_n$, $M_n^-$), and ($H_{n+1}$, $M_{n+1}^-$) are the vertices is determined from the following expression.

$$S_n = (|M_n^+ + M_{n+1}^+| \times |H_{n+1} - H_n|/2) + (|M_n^- + M_{n+1}^-| \times |H_{n+1} - H_n|/2)$$

The total area $S_{total}$ of the SFD curve is determined by the following expression:

$$S_{total} = S_1 + \ldots + S_n + S_{n+1} \ldots + S_{m-1} + S_m$$

where a minimum value of $H_0$ is $H_0$=−15000 [Oe] and a maximum value of $H_m$ is $H_m$=15000 [Oe].

The area $S_{high}$ is the sum of $S_n$ in a range of −15000 [Oe]≤$H_n$≤−10000 [Oe] and a range of 10000 [Oe]≤$H_n$≤15000 [Oe]. The area $S_{low}$ is the sum of $S_n$ in a range of 500≤$H_n$≤500 [Oe].

The area $S_{main}$ of a main peak of the SFD curve (the sum of the area $S_n$ in which the coercivity Hc is −10000 [Oe]<$H_n$<−500 [Oe] and 500 [Oe]<$H_n$<10000 [Oe]) is determined by the following expression.

$$S_{main} = S_{total} - S_{low} - S_{high}$$

A value of $H_{n+1}$−Hn is determined by a maximum magnetic field and a magnetic field step of an VSM measurement condition, and is in a range of 100≤|$H_{n+1}$−$H_n$|≤200 [Oe] based on a measurement condition of the M-H loop by the calculation method of the coercivity Hc described above. In addition, n and m are natural numbers. However, a range of |$H_{n+1}$−$H_n$| described above is selected such that $H_n$ is −10000 [Oe], −500 [Oe], 500 [Oe], and 10000 [Oe]. That is, the sides of the quadrangle having the area $S_n$ are selected so as to overlap with the straight line H=−10000 [Oe], the straight line H=−500 [Oe], the straight line H=500 [Oe], and the straight line H=10000 [Oe].

(Ratio of Component of Uniaxial Crystal Magnetic Anisotropy and Component of Multiaxial Crystal Magnetic Anisotropy)

A ratio L4/L2 of a uniaxial crystal magnetic anisotropy component L2 and a component L4 of a multiaxial crystal magnetic anisotropy component obtained by Fourier transforming a torque waveform of the magnetic recording medium 10 represents a strength of the uniaxial crystal magnetic anisotropy of the magnetic powder. The smaller the ratio L4/L2 is, the stronger the uniaxial crystal magnetic anisotropy of the magnetic powder is. The ratio L4/L2 is 0 or greater and 0.25 or less, preferably 0 or greater and 0.20 or less, and more preferably 0 or greater and 0.18 or less. If the ratio L4/L2 is equal to or greater than 0 and equal to or less than 0.25, the uniaxial crystal magnetic anisotropy of the magnetic powder becomes sufficiently strong, making it possible to reduce a noise. Accordingly, it is possible to improve an electromagnetic conversion characteristic.

The ratio L4/L2 described above is determined as follows.

(1) First, three pieces of magnetic recording media 10 are cut out to a predetermined size and those three pieces are attached together in a superimposed fashion, following which both surfaces are attached with a mending tape to obtain a stacked body. The thus-obtained stacked body is then punched with a round punch having a diameter φ=6.25 to obtain a circular sample.

(2) Next, the thus-obtained sample is AC demagnetized. This process is performed in consideration of a saturation of a magnetization upon application of an external magnetic field and a possibility that an output numerical value of a torque is not normal in a case where the magnetized sample is used.

(3) Next, the sample is set to a measurement device. Specifically, the sample is set perpendicular to a direction of an applied magnetic field in a case where the magnetic powder is perpendicularly oriented. On the other hand, in a case where the magnetic powder is longitudinally oriented, the sample is set horizontally with respect to the direction of the applied magnetic field.

(4) Next, the measurement device (TRT-2 type manufactured by Toei Industry Co., Ltd.) is subjected to a zero magnetic field adjustment, following which an external magnetic field of 15000 [Oe] is applied in a torque angle measuring mode to measure the torque waveform.

(5) After the measurement, the ratio L4/L2 is determined by using the uniaxial crystal magnetic anisotropy component L2 and the multiaxial crystal magnetic anisotropy component L4 which are displayed following a calculation of the Fourier transformation automatically performed by the measurement device.

(Thermal Stability Tb)

A thermal stability Tb ($=K_u V_{act}/k_B T$, where $K_u$: a crystal magnetic anisotropic constant of the magnetic powder, $V_{act}$: an activation volume of the magnetic powder, $k_B$: a Boltzmann constant, and T: an absolute temperature) of the magnetic recording medium 10 is preferably 60 or greater, more preferably 80 or greater, and even more preferably 85 or greater. If the thermal stability Tb is 60 or greater, it is possible to suppress a deterioration of an output signal of the magnetic recording medium 10.

The thermal stability Tb is calculated using the Sharrock expression represented below (reference: IEEE TRANSACTIONS ON MAGNETICS, VOL. 50, NO. 11, NOVEMBER 2014, and J. Flanders and M. P. Sharrock: J. Appl. Phys., 62, 2918 (1987)).

$$H_r(t')=H_0[1-\{k_B T/(K_u V_{act})\ln(f_0 t'/0.693)^n\}]$$

(where $H_r$: a residual magnetic field, t': a magnetization attenuation amount, $H_0$: a magnetic field change amount, $k_B$: a Boltzmann constant, T: an absolute temperature, $K_u$: a crystal magnetic anisotropic constant, $V_{act}$: an activation volume, $f_0$: a frequency factor, and n: a coefficient)

Note that (a) the residual magnetic field $H_r$, (b) the magnetization attenuation amount t', and (c) the magnetic field change amount $H_0$ are determined as follows. In addition, the following numerical values are used for (d) the frequency factor $f_0$ and (e) the coefficient n.

(a) It is possible to measure the residual magnetic field $H_r$ by the pulse VSM "HR-PVSM20" manufactured by Hayama Inc. A sample obtained by a fabrication method similar to that of the measurement method of the coercivity Hc described above is used for the measurement. A magnetic field of 6358 [Oe] is applied to the sample prior to starting of the measurement to magnetically orient the sample in one direction. Thereafter, a magnetic field is intermittently applied every 505.75 [Oe] from 0 to 20230 [Oe], and a magnetization amount at that time is measured to plot values with the applied magnetic field being an X axis and the magnetization amount being a Y axis. X when Y=0 is established in the thus-obtained graph is the residual magnetic field $H_r$.

(b) The magnetization attenuation amount t' is determined as follows. That is, an external magnetic field in the vicinity of the coercivity Hc of the magnetic recording medium 10 to be measured is applied under three conditions to measure the magnetization attenuation amount by a regular VSM. Further, from the magnetization attenuation amount, the magnetization attenuation amount t' is calculated using the Flanders expression (reference: I. P. J. Flanders and M. P. Sharrock, "An analysis of time-dependent magnetization and coercivity and of their relationship to print-through in recording tapes," J. Appl. Phys., vol. 62, pp. 2918-2928, 1987).

Here, the "coercivity Hc" means the coercivity Hc in a direction of orientation of the magnetic powder. That is, in a case where the magnetic powder is oriented in a perpendicular direction, the "coercivity Hc" means the coercivity Hc in the perpendicular direction. On the other hand, in a case where the magnetic powder is oriented in a longitudinal direction, the "coercivity Hc" means the coercivity Hc in the longitudinal direction.

In addition, "the external magnetic field of the three conditions" means a magnetic field equal to or greater than the coercivity Hc (a magnetic field by which a positive magnetization is obtained), a magnetic field close to the coercivity Hc (a magnetic field by which a magnetization close to 0 is obtained), and a magnetic field less than the coercivity Hc (a magnetic field by which a negative magnetization is obtained). As a specific example, in a case where a perpendicular orientation tape Hc=3800 [Oe], "the external magnetic field of the three conditions" is calculated as a magnetic field by which the positive magnetization is obtained=4000 [Oe], a magnetic field close to the coercivity Hc=3800 [Oe], and a magnetic field by the negative magnetization is obtained=3600 [Oe]. It should be noted, however, that the numerical values given as a specific example do not limit a numerical range in an actual measurement.

(c) The magnetic field change amount $H_0$ is a constant calculated by substituting the measurement magnetic field and the magnetization attenuation amount measured in (b) into the Sharrock expression.

(d) The frequency factor $f_0$ is a constant value and is defined as $f_0=5.0\times10^9$ Hz.

(e) The coefficient n is set to a value corresponding to a crystal magnetic anisotropy of the magnetic powder. In a case where the magnetic powder has the uniaxial crystal magnetic anisotropy, the coefficient n is set as n=0.5. On the other hand, in a case where the magnetic powder has the multiaxial crystal magnetic anisotropy (a triaxial crystal magnetic anisotropy), the coefficient n is set as n=0.77.

It is possible to determine whether the magnetic powder has the uniaxial crystal magnetic anisotropy or the multiaxial crystal magnetic anisotropy as follows. The processes (1) to (4) are performed in a manner similar to that of the calculation method of the ratio L4/L2 described above to measure the torque waveform. In a case where the measured torque waveform fluctuates in a 180° cycle, the magnetic powder is determined as having the uniaxial crystal magnetic anisotropy. If the measured torque waveform fluctuates in a 90° cycle, the magnetic powder is determined as having the multiaxial crystal magnetic anisotropy.

(Average Thickness of Magnetic Recording Medium)

An upper limit value of an average thickness (an average total thickness) $t_T$ of the magnetic recording medium 10 is 5.6 μm or less, preferably 5.0 μm or less, more preferably 4.6 μm or less, and still more preferably 4.4 μm or less. If the average thickness $t_T$ of the magnetic recording medium 10 is 5.6 μm or less, it is possible to increase the recording capacity that allows for recording in one data cartridge as compared with a typical magnetic recording medium. A lower limit value of the average thickness $t_T$ of the magnetic recording medium 10 is not particularly limited, but is, for example, 3.5 μm or greater.

The average thickness $t_T$ of the magnetic recording medium 10 is determined as follows. First, the magnetic recording medium 10 having a width of ½ inch is prepared and the magnetic recording medium 10 is cut into a length of 250 mm to fabricate a sample. Next, using a laser hologage (LGH-110C) manufactured by Mitutoyo Corporation as a measurement apparatus, a thickness of the sample is measured at positions of five or more, and measurement values at those positions are simply averaged (an arithmetic average) to calculate the average thickness $t_T[\mu m]$. Note that the measurement positions are randomly selected from the sample.

(Young's Modulus in Longitudinal Direction of Magnetic Recording Medium)

The Young's modulus in the longitudinal direction of the magnetic recording medium 10 is preferably equal to or less than 8.0 GPa, more preferably equal to or less than 7.9 GPa, still more preferably equal to or less than 7.5 GPa, and particularly preferably equal to or less than 7.1 GPa. If the Young's modulus in the longitudinal direction of the magnetic recording medium 10 is equal to or less than 8.0 GPa, the stretchability of the magnetic recording medium 10 by the external force is further increased, facilitating the adjustment of the width of the magnetic recording medium 10 by the tension adjustment. Accordingly, it is possible to appropriately suppress the off-track, and to accurately reproduce the data recorded in the magnetic recording medium 10.

The Young's modulus in the longitudinal direction of the magnetic recording medium 10 is a value indicating the difficulty in expansion and contraction in the longitudinal direction of the magnetic recording medium 10 by the external force. It is more difficult for the magnetic recording medium 10 to be expanded and contracted in the longitudinal direction by the external force as the value is larger, and it is easier for the magnetic recording medium 10 to be expanded and contracted in the longitudinal direction by the external force as the value is smaller.

It should be noted that the Young's modulus in the longitudinal direction of the magnetic recording medium 10 is the value related to the longitudinal direction of the magnetic recording medium 10, and correlates with the difficulty in the expansion and the contraction in a width direction of the magnetic recording medium 10 as well. That is, the larger the value, the harder it is for the magnetic recording medium 10 to expand and contract in the width direction by the external force, and the smaller the value, the easier it is for the magnetic recording medium 10 to expand and contract in the width direction by the external force. Accordingly, from a point of view of the tension adjustment, it is advantageous that the Young's modulus in the longitudinal direction of the magnetic recording medium 10 is small.

A tensile tester (AG-100D manufactured by Shimadzu Corporation) is used to measure the Young's modulus. A temperature of a measurement environment is 25° C. and a relative humidity is 55%. In a case of measuring the Young's modulus in the longitudinal direction of the magnetic recording medium 10, the magnetic recording medium 10 is cut into a length of 180 mm to prepare a measurement sample. A jig capable of fixing a width (½ inch) of the measurement sample is attached to the tensile tester described above, and the top and the bottom of the measurement sample width are fixed. A distance (a length of the measurement sample between the chucks) is set to 100 mm. After chucking the measurement sample, a stress is gradually applied in a direction in which the measurement sample is to be pulled. A tensile rate is set to 0.1 mm/min. On the basis of a change in the stress and an amount of elongation at this time, the Young's modulus is calculated using the following expression.

$E(N/m^2) = ((\Delta N/S)/(\Delta x/L)) \times 10^6$

ΔN: Change in stress (N)
S: Cross-sectional area (mm$^2$) of test piece
Δx: Amount of elongation (mm)
L: Distance between gripping jigs (mm)

A range of the stress is 0.5 N to 1.0 N, and the change in stress (ΔN) and the amount of elongation (Δx) at this time are used for the calculation.

(Arithmetic Average Roughness)

An arithmetic average roughness Ra of a surface of the recording layer 13 is preferably 2.5 nm or less, more preferably 2.2 nm or less, still more preferably 2.0 nm or less, and most preferably 1.9 nm or less. If the arithmetic average roughness Ra is 2.5 nm or less, it is possible to suppress a decrease in output due to a spacing loss, making it possible to improve an electromagnetic conversion characteristic. A lower limit value of the arithmetic average roughness Ra of the surface of the recording layer 13 is preferably 1.0 nm or greater, more preferably 1.2 nm or greater, and still more preferably 1.4 nm or greater. If the lower limit value of the arithmetic average roughness Ra of the surface of the recording layer 13 is 1.0 nm or greater, it is possible to suppress a decrease in a traveling property caused by an increase in a friction.

The arithmetic average roughness Ra is determined as follows. First, a surface of the recording layer 13 is observed by AFM (Atomic Force Microscope) to obtain an AFM image of 40 μm×40 μm. As the AFM, Nano Scope IIIa D3100 manufactured by Digital Instruments Corporation, and as a cantilever, a silicon single crystal is used (Note 1), and a tapping frequency is tuned to 200 to 400 Hz to perform a measurement. Next, the AFM image is divided into 512×512 (=262,144) measurement points, and a height Z(i) (i: measurement point number, i=1 to 262,144) is measured at each measurement point. The height Z(i) of each measurement point is simply averaged (an arithmetic average) to calculate an average height (an average plane) $Z_{ave}$ (=(Z(1)+Z(2)+ . . . +Z(262,144))/262,144) is calculated. Subsequently, a deviation Z"(i) (=Z(i)−$Z_{ave}$) from the mean centerline at the respective measurement points is obtained, and an arithmetic average roughness Ra[nm] (=(Z"(1)+Z"(2)+ . . . +Z"(262,144))/262,144) is calculated. At this time, as image processing, data obtained by a filtering process based on Flatten order2 and planefit order 3 XY is used.

(Note 1) Nano World SPM probe NCH Normal type Point-Probe L (cantilever length)=125 μm (Intensity of Magnetic Field to be Applied by Magnetic Head)

The magnetic recording medium 10 is to be used for a recording reproducing apparatus having a recording head configured to apply a magnetic field of preferably 10000 Oe or greater, more preferably 13000 Oe or greater, and even more preferably 15000 Oe or greater. The recording reproducing apparatus having the recording head configured to apply the magnetic field equal to or greater than 10000 Oe can generate the magnetization reversal particularly easily due to the leakage magnetic field of the recording head. Accordingly, if the area ratio $R_{low}$ (=($S_{low}/S_{total}$)×100) is 5.5% or less in a case of writing a signal into the magnetic recording medium 10 by using the recording reproducing apparatus, an effect of suppressing the magnetization reversal due to the leakage magnetic field remarkably appears. Hence, an effect of improving an electromagnetic conversion characteristic is remarkably exhibited.

The intensity of the magnetic field to be applied to the magnetic recording medium 10 is determined by a material used for the recording head.

(Recording Wavelength)

The recording layer 13 is configured to allow recording of a signal at a shortest recording wavelength λ of preferably 97 nm or less, more preferably 90 nm or less, and even more preferably 83 nm or less, from a viewpoint of improving the recording capacity. In addition, in a case where the shortest recording wavelength λ is 97 nm, an effect of suppressing the magnetization reversal due to the leakage magnetic field remarkably appears. Hence, an effect of improving an electromagnetic conversion characteristic is remarkably exhibited.

The shortest recording wavelength λ is determined as follows. The magnetic recording medium 10 in which data is recorded on the entire surface is prepared, and a data recording pattern of a data band section of the recording layer 13 is observed using a magnetic force microscope (Magnetic Force Microscope: MFM) to obtain an MFM image. The NANO SCOPE manufactured by Digital Instruments Corporation and its analysis software are used as the MFM. A measurement region of the MFM image is 2 μm×2 μm, and the 2 μm×2 μm measurement region is divided into 512-512 (=262,144) measuring points. A measurement based on the MFM is performed on three 2 μm×2 μm measurement regions at different locations, i.e., three MFM images are obtained. 50 bit-to-bit distances are measured from a two-dimensional irregular chart of the recording pattern of the obtained MFM image. A measurement of the bit-to-bit distance is performed using analysis software attached to the NANO SCOPE. A value that is approximately the largest common divisor of the measured 50 bit-to-bit distances is the minimum value L of the inter-magnetization reversal distance. Note that a measurement condition includes a sweep speed: 1 Hz, a used chip: MFMR manufactured by NANO WORLD, a lift height: 225 μm, and a correction: Flatten order 3. By doubling the minimum value L of the inter-magnetization reversal distance, the shortest recording wavelength λ is determined.

3 Method of Manufacturing Magnetic Recording Medium

Next, an example of a method of manufacturing the magnetic recording medium 10 having the above-described configuration will be described.

(Preparation Process of Paints)

First, a foundation layer formation paint is prepared by kneading and dispersing the non-magnetic powder, the binder, and the like in a solvent. Next, a magnetic layer formation paint is prepared by kneading and dispersing the magnetic powder, the binder, and the like in a solvent. For preparing the magnetic layer formation paint and the foundation layer formation paint, for example, it is possible to use the following solvent, dispersing apparatus, and kneading apparatus.

Examples of the solvent to be used for the preparation of the paints described above include ketone-based solvents such as acetone, methyl ethyl ketone, methyl isobutyl ketone, or cyclohexanone, alcohol-based solvents such as methanol, ethanol, or propanol, ether-based solvents such as methyl acetate, ethyl acetate, butyl acetate, propyl acetate, ethyl lactate, or ethylene glycol acetate, ether-based solvents such as diethylene glycol dimethyl ether, 2-ethoxyethanol, tetrahydrofuran, or dioxane, aromatic hydrocarbon-based solvents such as benzene, toluene, or xylene, and halogenated hydrocarbon-based solvents such as methylene chloride, ethylene chloride, carbon tetrachloride, chloroform, or chlorobenzene. These may be used alone, or may be mixed on an as-necessary basis to be used.

Examples of the kneading apparatus to be used for the preparation of the paints described above include a continuous twin-screw kneader, a continuous twin-screw kneader that allows for a dilution in multiple stages, a kneader, a pressure kneader, and a roll kneader, although the kneading apparatus to be used for the preparation of the paints described above is not particularly limited to these apparatuses. In addition, examples of the dispersing apparatus to be used for the preparation of the paints described above include a roll mill, a ball mill, a horizontal sandmill, a vertical sandmill, a spike mill, a pin mill, a tower mill, a pearl mill (such as the "DCP Mill" manufactured by Eirich), a homodinizer, and an ultrasound disperser, although the kneading apparatus to be used for the preparation of the paints described above is not particularly limited to these apparatuses.

(Application Process)

Next, the foundation layer formation paint is applied to one principal face of the base layer 11 and dried to form the foundation layer 12. Subsequently, the recording layer 13 is formed on the foundation layer 12 by application of the magnetic layer formation paint on the foundation layer 12 and drying. It should be noted that, upon drying, the magnetic powder may be subjected to a magnetic field orientation in the thickness direction of the base layer 11 by a solenoidal coil, for example. In addition, upon drying, the magnetic powder may be subjected to a magnetic field orientation in the traveling direction (the longitudinal direction) of the base layer 11, following which the magnetic powder may be subjected to the magnetic field orientation in the thickness direction of the base layer 11, by the solenoidal coil, for example. Performing the process of once orienting the magnetic powder in the longitudinal direction makes it possible to further improve the degree of perpendicular orientation of the magnetic powder (the squareness ratio Rs). After the recording layer 13 is formed, the back layer 14 is formed on the other principal face of the base layer 11. Thus, the magnetic recording medium 10 is obtained.

The squareness ratio Rs is set to a desired value by adjusting, for example, an intensity of the magnetic field to be applied to a coating film of the magnetic layer formation paint, a concentration of the solid content in the magnetic layer formation paint, and drying conditions (a drying temperature and the drying time) of a coating film of the magnetic layer formation paint. The intensity of the magnetic field to be applied to the coating film is preferably 2 times or greater and 3 times or less of the coercivity of the magnetic powder. In order to further increase the squareness ratio Rs, it is preferable to improve the dispersion state of the magnetic powder in the magnetic layer formation paint. In addition, in order to further improve squareness ratio Rs, it is also effective to magnetize the magnetic powder in advance at a stage prior to the entry of the magnetic layer formation paint into an orientation apparatus used for a magnetic field orientation of the magnetic powder. Note that a method of adjusting the squareness ratio Rs described above may be used alone or in combination of two or more.

(Calender Process and Cutting Process)

Thereafter, the thus-obtained magnetic recording medium 10 is rewound into a large-diameter core, and a hardening process is performed. Finally, the magnetic recording medium 10 is subjected to a calender process and cut to a

4 Workings and Effects

As described above, in the magnetic recording medium 10 according to one embodiment, the area ratio $R_{low}$ ($=(S_{low}/S_{total})\times 100$) of the total area $S_{total}$ of the SFD curve of the recording layer 13 in the perpendicular direction and the area $S_{low}$ of the SFD curve of the recording layer 13 in the perpendicular direction in which the coercivity Hc is in a range from −500 [Oe]≤Hc≤500 [Oe] is 5.5% or less, making it possible to reduce the low Hc component. Thus, as illustrated in FIG. 4A, the magnetization reversal due to a leakage magnetic field 102 is suppressed even if the leakage magnetic field 102 from a recording head 101 is present at the time of writing. Accordingly, even if the leakage magnetic field 102 from the recording head 101 is present at the time of writing, it is possible to keep the magnetization distribution of the recording layer 13 sharp as illustrated in FIG. 4B, and thereby to suppress a deterioration of the recording signal. That is, it is possible to suppress the reproduction signal from becoming broad as illustrated in FIG. 4C. Hence, it is possible to achieve a good electromagnetic conversion characteristic.

In an existing magnetic recording medium that uses the ε iron oxide magnetic powder, a recording layer contains a large amount of low Hc components. The low Hc component of the recording layer in the perpendicular direction is a component that does not contribute to the recording of a signal, and thus can be a noise source. In addition, because the squareness ratio Rs of the recording layer in the perpendicular direction is lowered, a reproduction output is also weakened. Accordingly, an electromagnetic conversion characteristic becomes low in the existing magnetic recording medium that uses the ε iron oxide magnetic powder. In contrast, the magnetic recording medium 10 according to one embodiment makes it possible to reduce the low Hc component of recording layer 13 which serves as a noise source. In addition, because it is possible to increase the squareness ratio Rs of the recording layer 13 in the perpendicular direction, it is possible to increase the reproduction output. Hence, it is possible to achieve a good electromagnetic conversion characteristic.

In order to increase the recording capacity of the magnetic recording medium, it is necessary to shorten the shortest recording wavelength. In other words, it is necessary to reduce the area of the recording layer used per 1 bit. However, the low Hc component of the recording layer can result in an easier occurrence of the magnetization reversal due to an influence of the external magnetic field. Accordingly, if the shortest recording wavelength is shortened, the magnetization reversal (i.e., a recording demagnetization) is likely to occur due to the leakage magnetic field from the recording head at the time of writing. When the magnetization reversal occurs, a magnetization distribution of the recording layer 13 becomes less sharp and a reproduction signal becomes broad. Accordingly, there is a possibility that it becomes difficult to further reduce the area of the recording layer 13 used per 1 bit. Hence, there is a possibility that the recording of the signal at a short wavelength becomes difficult.

In contrast, in the magnetic recording medium 10 according to one embodiment, the area ratio $R_{low}$ ($=(S_{low}/S_{total})\times 100$) is 5.5% or less, making it possible to reduce the low Hc component. Thus, even when the shortest recording wavelength is shortened, the magnetization reversal due to the leakage magnetic field 102 from the recording head 101 at the time of the signal writing is suppressed. Accordingly, the magnetization distribution of the recording layer 13 becomes sharp, making it possible to reduce the area of the recording layer 13 used per 1 bit. Hence, it is possible to record a signal at a short wavelength.

In a case where the coercivity Hc of the recording layer 13 is 3000 [Oe] or greater, it is necessary to use a next-generation head capable of applying, to the recording layer 13, a magnetic field higher than that of an existing recording head at the time of writing a signal. In a case of using such a recording head, the magnetization reversal is particularly apt to occur due to the leakage magnetic field of the recording head. Accordingly, if the area ratio $R_{low}$ ($=(S_{low}/S_{total})\times 100$) is 5.5% or less in a case where the coercivity Hc of the recording layer 13 is 3000 [Oe] or greater, an effect of suppressing the magnetization reversal due to the leakage magnetic field remarkably appears. Hence, an effect of improving an electromagnetic conversion characteristic is remarkably exhibited.

EXAMPLES

Hereinafter, the present disclosure will be described specifically by referring to Examples, but the present disclosure is not limited to these Examples.

Example 1

(Preparation Process of Magnetic Layer Formation Paint)

The magnetic layer formation paint was prepared as follows. First, a first composition having the following formulation was kneaded in an extruder. Next, the kneaded first composition and a second composition having the following formulation were added to a stirring tank having a disper to perform premixing. Subsequently, a sand mill mixing was further performed, and a filter process was performed to prepare the magnetic layer formation paint.
(First Composition)
An ε-iron oxide particle powder illustrated in Table 1 (where Ga is included as an additive element): 100 parts by mass A vinyl chloride-based resin (30% by mass of a cyclohexanone solution): 45 parts by mass (including a solution)

(A polymerization degree: 300, Mn=10000, contains $OsO_3K$=0.07 mmol/g and secondary OH=0.3 mmol/g as polar groups)

An aluminum oxide powder: 5 parts by mass ($\alpha$-$Al_2O_3$, an average particle size of 0.2 μm)

Carbon black: 2 parts by mass (manufactured by Tokai Carbon Co., Ltd., trade name: SEAST TA)
(Second Composition)

A vinyl chloride-based resin: 15 parts by mass (including a solution)

(a resin solution: a resin content of 30% by mass, cyclohexanone of 70% by mass)

n-butyl stearate: 2 parts by mass

Methyl ethyl ketone: 121.3 parts by mass

Toluene: 121.3 parts by mass

Cyclohexanone: 60.7 parts by mass

Lastly, to the magnetic layer formation paint prepared as described above, polyisocyanate (trade name: Coronate L, manufactured by Nippon Polyurethane Co., Ltd.): 4 parts by mass was added as a hardener, and stearic acid: 2 parts by mass was added as a lubricant.
(Preparation Process of Foundation Layer Formation Paint)

The foundation layer formation paint was prepared as follows. First, a third composition having the following formulation was kneaded in an extruder. Next, the kneaded third composition and a fourth composition having the following formulation were added to a stirring tank having a disper to perform premixing. Subsequently, a sand mill mixing was further performed, and a filter process was performed to prepare the foundation layer formation paint.
(Third Composition)
A needle-shaped iron oxide powder: 100 parts by mass ($\alpha$-$Fe_2O_3$, an average major axis length of 0.15 μm)
A vinyl chloride resin: 55.6 parts by mass
(A resin solution: a resin content of 30% by mass, cyclohexanone of 70% by mass)
Carbon black: 10 parts by mass
(An average particle size of 20 nm)
(Fourth Composition)
A polyurethane-based resin UR8200 (manufactured by Toyobo Co., Ltd.): 18.5 parts by mass
n-butyl stearate: 2 parts by mass
Methyl ethyl ketone: 108.2 parts by mass
Toluene: 108.2 parts by mass
Cyclohexanone: 18.5 parts by mass Lastly, to the foundation layer formation paint prepared as described above, polyisocyanate (trade name: Coronate L, manufactured by Nippon Polyurethane Co., Ltd.): 4 parts by mass was added as a hardener, and stearic acid: 2 parts by mass was added as a lubricant.
(Preparation Process of Back Layer Formation Paint)
The back layer formation paint was prepared as follows. The following raw materials were mixed in a stirring tank having a disper and a filter process was performed to prepare the back layer formation paint.
Carbon black (manufactured by Asahi Co. Ltd., trade name: #80); 100 parts by mass
Polyester Polyurethane: 100 parts by mass
(manufactured by Nippon Polyurethane Co., Ltd., trade name: N-2304)
Methyl ethyl ketone: 500 parts by mass
Toluene: 400 parts by mass
Cyclohexanone: 100 parts by mass
(Application Process)
Using the recording layer formation paint and the foundation layer formation paint prepared as described above, the foundation layer and the recording layer were formed as follows on one principal surface of an elongated polyethylene naphthalate film (hereinafter referred to as "PEN film") which is a nonmagnetic supporting body and had an average thickness of 4.0 μm. First, the foundation layer was so formed that the average thickness after calendering becomes 0.9 μm by applying the foundation layer formation paint on one principal surface of the PEN film and drying the same. Next, the recording layer was so formed that the average thickness after the calendering becomes 80 nm by applying the recording layer formation paint on the foundation layer and drying the same. Incidentally, the magnetic powder was subjected to a magnetic field orientation in a thickness direction of the film by a solenoidal coil upon drying of the recording layer formation paint. In addition, drying conditions of the recording layer formation paint (a drying temperature and a drying time) were adjusted to set the squareness ratio Rs in the thickness direction (the perpendicular direction) of the magnetic tape to 74.3%. Subsequently, the back layer was so formed that the average thickness after the calendering becomes 0.4 μm by applying the back layer formation paint on the other principal surface of the PEN film and drying the same. The above thus obtained the magnetic tape.
(Calender Process and Cutting Process)
The thus-obtained magnetic tape was subjected to a hardening treatment, followed by a calender process to smooth a surface of the recording layer. At this time, the arithmetic average roughness Ra of the surface of the recording layer was set to 1.4 nm by adjusting a condition of the calender process.
(Cutting Process)
The magnetic tape obtained as described above was cut to ½ inch (12.65 mm) wide. This had obtained the magnetic tape of the average thickness of 5.38 μm.

Comparative Example 1

A magnetic tape was obtained in a manner similar to that of the Example 1, except that the ε iron oxide particle powder illustrated in Table 1 was used as the magnetic powder.

Comparative Example 2

A magnetic tape was obtained in a manner similar to that of the Example 1, except that the ε iron oxide particle powder illustrated in Table 1 was used as the magnetic powder.
[Evaluation]
The following evaluation was performed on the recording layers of the magnetic tapes according to the Example 1 and the comparative examples 1 and 2 which were obtained as described above.
(Mst and Mrt)
Mst[mA] and Mrt[mA] (Mr) (where Mst is the product of the saturation magnetization Ms and the thickness t of the recording layer, and Mrt is the product of the remanent magnetization Mr and the thickness t of the recording layer) were determined as follows. First, an M-H loop following the background correction was obtained in a manner similar to that of the calculation method of the coercivity Hc according to one embodiment described above. Next, the saturation magnetization Ms[emu] and the remanent magnetization Mr[emu] were obtained from the thus-obtained M-H loop following the background correction. Thereafter, Mst[mA] was calculated by dividing the saturation magnetization Ms[emu] by the area of a measurement sample. Further, Mrt[mA] was calculated by dividing the remanent magnetization Mr[emu] by the area of the measurement sample.
(Coercivity Hc, Squareness Ratio Rs, SFD, Half Width Ha, Thermal Stability Tb, and Arithmetic Average Roughness Ra)
The coercivity Hc, the squareness ratio Rs, the SFD, the half width Ha, the thermal stability Tb, and the arithmetic average roughness Ra were determined by the calculation methods described in one embodiment described above. FIG. 5A, FIG. 6A and FIG. 7A respectively illustrate M-H loops measured by applying a magnetic field in the perpendicular direction of the magnetic tapes according to the Example 1 and the comparative examples 1 and 2. FIG. 5B, FIG. 6B, and FIG. 7B respectively illustrate SFD curves obtained from the M-H loops illustrated in FIG. 5A, FIG. 6A, and FIG. 7A. Incidentally, for the magnetic tape according to the comparative example 2, it was unable to calculate the half width Ha and the SFD by the measurement and analysis programs attached to the VSM because the half width Ha falls within a range of H≤0. It should be appreciated that the low Hc component is large and the SFD is large so that a good electromagnetic conversion characteristic tends not to be achieved in a case where a half width overlaps the two quadrants as with the magnetic tape according to the comparative example 2.

(Areas and Area Ratios of SFD Curve)

The areas $S_{total}$, $S_{low}$, $S_{main}$, $S_{high}$, and the area ratios $R_{low}$ and $R_{high}$ were determined by the calculation method described in one embodiment described above. Further, the $S_{total}$ and the $R_{main}$ determined as described above were used to determine the area ratio $R_{main}$ $(=(S_{main}/S_{total})\times100)$.

(SNR (Electromagnetic Conversion Characteristic))

An SNR (an electromagnetic conversion characteristic) of the magnetic tapes according to the Example 1 and the comparative examples 1 and 2 was evaluated as follows. The SNR of the magnetic tape in a 25° C. environment was measured using a ½ inch tape traveling device (MTS Transport manufactured by Mountain Engineering II) equipped with a recording/reproducing head and a recording/reproducing amplifier. A ring head having a gap length of 0.2 µm was used as a recording head, and a GMR head having a distance between shields of 0.1 µm was used as a reproducing head. A relative speed was 6 m/s, a recording clock frequency was 160 MHz, and a recording track width was 2.0 µm. Further, the SNR was calculated on the basis of a method described in the following literature. The results are illustrated in FIG. 8 as relative values where BBSNR was 0 dB with a recording linear density being 500 kbi.

Y. Okazaki: "An Error Rate Emulation System.", IEEE Trans. Man., 31, pp. 3093-3095 (1995)

(Signal Attenuation Amount)

KuV/kBT is known as an index of the thermal stability of a magnetic material, and a signal once recorded on a magnetic tape is reproduced in a short time and an amount of attenuation of a reproduction signal after a long period of time can be estimated from an amount of attenuation thereof (Reference "Long-term storage performance of barium ferrite medium for linear tape system", Technical Research Report of the Society of Electronic Information and Communications, MR, Magnetic Recording 112 (137), 53-57, 2012 Jul. 12).

In the measurement of the signal attenuation amount of the magnetic tapes according to the Example 1 and the comparative examples 1 and 2, "Tape Head Tester" (hereinafter referred to as "THT") manufactured by Micro Physics was used. For the recording/reproducing head, a recording/reproducing head installed a tape drive "TS1140" manufactured by IBM Corporation was used as it was. At the time of measurement, the magnetic tape was cut to a length of 90 cm, formed into a ring shape so that the recording layer of the magnetic tape was on the back side, and then both ends of the magnetic tape were joined with an adhesive tape from the back side of the magnetic tape. In addition, next to the joint, a silver tape for to detecting a tape circulation position was attached. The ring-shaped magnetic tape was attached to the THT and then circulated at a speed of 2 m/sec.

Next, a 10 MHz signal generated using a signal generator "ARBITRARY WAVEFORM GENERATOR AWG2021" manufactured by Tektronix Co., was recorded for the entire length of the tape using an optimum recording current for the magnetic tape.

Following the recording, from the next lap, the signal recorded on the tape was continuously reproduced, and a reproduction output was measured with a spectrum analyzer "8591E" manufactured by Hewlett Packard. The spectrum analyzer settings at this time were RBW: 1 MHz, VBW: 1 MHz, SWP: 500 msec, point: 400, and a zero span mode.

The measurement was performed only for 0.4 seconds between only a "recording part" excluding "the vicinity of the tape joint" where the sufficient recording was not performed, and an average value Y of the reproduction output during this period was calculated. The measurement was performed for each tape lap, and the average value Y of the reproduction output in each lap was defined as a reproduction output average value Y(t) in the elapsed time from the end (t=0) of the signal recording.

The measurement was performed up to t=100 sec, and it was timely transmitted to a connected personal computer to perform the recording.

The above measurement was performed four times using the same magnetic tape, and Y(t) values obtained by the respective measurements were averaged for the same elapsed time t to obtain a numerical sequence of Yave(t).

The obtained Yave(t) was plotted on a Y-axis and the elapsed time t was plotted on an X-axis to plot them on a graph, and an approximate curve was created from the graph using logarithmic approximation. Using the thus-obtained approximate curve, the signal attenuation amounts after 1 year, 5 years, and 10 years were calculated.

Table 1 represents characteristics of the magnetic powders used in the respective magnetic tapes according to the Example 1 and the comparative examples 1 and 2.

TABLE 1

| | Magnetic Properties of Magnetic Powder | | | | Particle Size | | |
|---|---|---|---|---|---|---|---|
| | | | | | | Distribution | |
| | σS [emu/g] | Hc [Oe] | Rs [%] | SFD | Thermal Stability Δ $(=K_uV_{act}/K_BT)$ | Average Particle Diameter [nm] | (σ/D) × 100 [%] | Particle Volume [nm³] |
| Example 1 | 16.1 | 4384 | 62.1 | 0.71 | 55 | 16.4 | 12.6 | 2300 |
| Comparative Example 1 | 16.7 | 2348 | 50.5 | 0.96 | 53 | 19.3 | 27.3 | 3750 |
| Comparative Example 2 | 17.2 | 2266 | 54.5 | 1.1 | 45 | 15.7 | 16.7 | 2000 |

Table 2 represents an evaluation result of magnetic properties of the recording layers provided in the respective magnetic tapes according to the Example 1 and the comparative examples 1 and 2.

TABLE 2

| | Measurement Direction | Mst [mA] | Mrt [mA] | Hc [Oe] | Rs [%] | SFD (=Ha/Hc) | Ha [Oe] | Thermal Stability Δ (=$K_u V_{act}/K_B T$) | Ra [nm] |
|---|---|---|---|---|---|---|---|---|---|
| Example 1 | Perpendicular | 2.9 | 2.15 | 3782 | 74.3 | 0.93 | 3534 | 63 | 1.4 |
| Comparative Example 1 | Perpendicular | 2.78 | 1.67 | 2220 | 60.2 | 1.31 | 2907 | 64 | 1.5 |
| Comparative Example 2 | Perpendicular | 2.74 | 1.67 | 1791 | 60.7 | — | — | 47 | 1.4 |

Table 3 represents an evaluation result of SFD curves of the recording layers provided in the respective magnetic tapes according to the Example 1 and the comparative examples 1 and 2.

TABLE 3

| | Measurement Direction | Area | | | | Area Ratio | | |
|---|---|---|---|---|---|---|---|---|
| | | $S_{total}$ | $S_{low}$ | $S_{main}$ | $S_{high}$ | $R_{low}$ [%] | $R_{main}$ [%] | $R_{high}$ [%] |
| Example 1 | Perpendicular | 9874 | 357 | 9085 | 432.9 | 3.6 | 92 | 4.4 |
| Comparative Example 1 | Perpendicular | 9041 | 789 | 7796 | 456.2 | 8.7 | 86.2 | 5 |
| Comparative Example 2 | Perpendicular | 8938 | 1111 | 7499 | 328.1 | 12.4 | 83.9 | 3.7 |

FIG. 8 illustrates evaluation results of electromagnetic conversion characteristics of the respective magnetic tapes according to the Example 1 and the comparative examples 1 and 2. In FIG. 8, the SNRs of the respective magnetic tapes according to the comparative examples 1 and 2 tend to decrease as the linear recording density increases, as compared with the SNR of the magnetic tape according to the Example 1. That is, slopes of the SNRs in the respective magnetic tapes according to the comparative examples 1 and 2 tend to be larger than the slope of the SNR of the magnetic tape according to the Example 1. This is presumably due to the following reasons. That is, in the magnetic tapes according to the comparative examples 1 and 2 in which the low Hc component of recording layer is large, the magnetization reversal (the write demagnetization) is more likely to occur than in the magnetic tape according to the Example 1 in which the low Hc component of the recording layer is small. In addition, as the linear recording density increases, a length of one bit (a magnetic domain) decreases. Accordingly, an influence of a noise due to the magnetization reversal (the write demagnetization) appears strongly. In other words, the deterioration in the SNR appears remarkably in a high linear recording density range (i.e., in a short wavelength range).

Hence, in the magnetic tape according to the Example 1 in which the area ratio $R_{low}$ (=$(S_{low}/S_{total})\times100$) is 5.5% or less, it is possible to achieve a good electromagnetic conversion characteristic (SNR) even in the short wavelength recording (i.e., the high recording density) as compared with the magnetic tapes according to the comparative examples 1 and 2 in which the area ratio $R_{low}$ (=$(S_{low}/S_{total})\times100$) exceeds 5.5%.

FIG. 9 illustrates evaluation results of the signal attenuation amounts of the respective magnetic tapes according to the Example 1 and the comparative examples 1 and 2. The following can be appreciated from FIG. 9 and Table 2. The signal attenuation amount of the magnetic tape (the average particle size: 16.4 nm) according to the Example 1 is smaller than the signal attenuation amount of the magnetic tape (the average particle size: 15.7 nm) according to the comparative example 2 having the average particle size comparable to that of the Example 1. The signal attenuation amount of the magnetic tape (the average particle size: 16.4 nm) according to the Example 1 is comparable to the signal attenuation amount of the magnetic tape (the average particle size: 19.3 nm) according to the comparative example 1 in which the average particle size is larger than that of the Example 1.

Therefore, in the magnetic tape according to the Example 1, even when the particle size of the magnetic powder is reduced and the shortest recording wavelength is shortened, that is, even when the recording capacity is increased, it is possible to suppress the decrease in the thermal stability Tb.

While embodiments and modification examples of the present disclosure have been specifically described above, the present disclosure is not limited to the above-described embodiments and the modification examples, and various modifications based on the technical idea of the present disclosure can be made. For example, configurations, methods, process steps, shapes, materials, numerical values, and the like described in the above embodiments and modification examples are merely examples, and other configurations, methods, process steps, shapes, materials, numerical values, and the like may be used on an as-necessary basis. In addition, it is possible to combine with each other configurations, methods, process steps, shapes, materials, numerical values, and the like of the above-described embodiments and modification examples without departing from the spirit of the present disclosure.

In addition, a chemical formula of a compound or the like exemplified in the above embodiments and modification examples is typical, and is not limited to the described equivalent number and the like as long as the generic name of the same compound is used. In numerical ranges described stepwise in the above embodiments and the modification examples, an upper limit value or a lower limit value of a numerical range of a certain level may be replaced by an upper limit value or a lower limit value of a numerical range of another level. Unless otherwise specified, it is possible to use one of the materials exemplified in the above embodiments and modification examples alone, or it is possible to use two or more of the materials exemplified in the above embodiments and modification examples in combination.

Further, the present disclosure may adopt the following configuration.

(1)

A tape-shaped magnetic recording medium including a recording layer including an ε-iron oxide particle, in which an area ratio $R_{low}$ (=($S_{low}/S_{total}$)×100) of a total area $S_{total}$ of an SFD curve of the recording layer in a perpendicular direction and an area $S_{low}$ of the SFD curve in which a coercivity Hc is in a range from −500 [Oe]≤Hc≤500 [Oe] is equal to or less than 5.5%.

(2)

The magnetic recording medium according to (1), in which the coercivity of the recording layer in the perpendicular direction is equal to or greater than 30001 [Oe] and equal to or less than 5000 [Oe].

(3)

The magnetic recording medium according to (1) or (2), in which a squareness ratio Rs of the recording layer in the perpendicular direction is equal to or greater than 70%.

(4)

The magnetic recording medium according to any one of (1) to (3), in which an SFD of the recording layer in the perpendicular direction is equal to or less than 1.1.

(5)

The magnetic recording medium according to any one of (1) to (4), in which a thermal stability Tb (=$K_u V_{act}/k_B T$, where $K_u$: a crystal magnetic anisotropic constant of a magnetic powder, $V_{act}$: an activation volume of the magnetic powder, $k_B$: a Boltzmann constant, and T: an absolute temperature) of the magnetic recording medium is equal to or greater than 60.

(6)

The magnetic recording medium according to any one of (1) to (5), in which the recording layer is configured to allow recording of a signal at a shortest recording wavelength λ of equal to or less than 96 nm.

(7)

The magnetic recording medium according to any one of (1) to (6), in which the magnetic recording medium is to be used for a recording reproducing apparatus configured to apply a magnetic field of equal to or greater than 13000 Oe.

(8)

The magnetic recording medium according to any one of (1) to (7), in which an area ratio $R_{high}$ (=($S_{high}/S_{total}$)×100) of the total area $S_{total}$ of the SFD curve and an area $S_{high}$ of the SFD curve in which the coercivity Hc is in a range from −15000 [Oe]≤Hc≤−10000 [Oe] and in which the coercivity Hc is in a range from 10000 [Oe]≤Hc≤15000 [Oe] is equal to or less than 5%.

(9)

The magnetic recording medium according to any one of (1) to (8), in which an arithmetic average roughness Ra of a surface of the recording layer is equal to or less than 2.0 nm.

(10)

The magnetic recording medium according to any one of (1) to (9), in which the ε-iron oxide particle includes at least one of Al or Ga.

DESCRIPTION OF NUMERALS

10 Magnetic recording medium
11 Base
12 Foundation layer
13 Recording layer
14 Back layer
101 Recording head
102 Leakage magnetic field

The invention claimed is:

1. A tape-shaped magnetic recording medium comprising:
a recording layer including an ε-iron oxide particle,
wherein an area ratio $R_{low}$ defined by ((an area $S_{low}$/a total area $S_{total}$)×100) is 3.6% to 5.5%, where the total area $S_{total}$ is a total area of a switching field distribution (SFD) curve of the recording layer in a perpendicular direction, and where the area $S_{low}$ is an area of the SFD curve corresponding to a low coercivity Hc component in a range from −500[Oe]≤Hc≤500[Oe],
wherein an SFD of the recording layer in the perpendicular direction is equal to or less than 1.1,
wherein a coercivity Hc of the recording layer in the perpendicular direction is equal to or greater than 3000[Oe] and equal to or less than 5000[Oe],
wherein a squareness ratio Rs of the recording layer in the perpendicular direction is equal to or greater than 70%,
wherein the magnetic recording medium includes a base layer having an average thickness of 4.2 μm or less,
wherein the base layer includes a polyester, and
wherein the ε-iron oxide particle has an average particle size of 16.4 nm or less.

2. The magnetic recording medium according to claim 1, wherein a thermal stability Tb (=$K_u V_{act}/k_B T$, where $K_u$: a crystal magnetic anisotropic constant of a magnetic powder, $V_{act}$: an activation volume of the magnetic powder, $k_B$: a Boltzmann constant, and T: an absolute temperature) of the magnetic recording medium is equal to or greater than 60.

3. The magnetic recording medium according to claim 1, wherein the recording layer is configured to allow recording of a signal at a shortest recording wavelength λ of equal to or less than 97 nm.

4. The magnetic recording medium according to claim 1, wherein the magnetic recording medium is to be used for a recording reproducing apparatus configured to apply a magnetic field of equal to or greater than 13000 Oe.

5. The magnetic recording medium according to claim 1, wherein an area ratio $R_{high}$ (=($S_{high}/S_{total}$)×100) of the total area $S_{total}$ of the SFD curve and an area $S_{high}$ of the SFD curve in which the coercivity Hc is in a range from −15000 [Oe]≤Hc≤−10000[Oe] and in which the coercivity Hc is in a range from 10000[Oe]≤Hc≤15000[Oe] is equal to or less than 5%.

6. The magnetic recording medium according to claim 1, wherein an arithmetic average roughness Ra of a surface of the recording layer is equal to or less than 2.0 nm.

7. The magnetic recording medium according to claim 1, wherein the iron oxide particle includes at least one of Al or Ga.

8. The magnetic recording medium according to claim 1, wherein the ε-iron oxide particle includes Ga.

* * * * *